(12) United States Patent
Thomas

(10) Patent No.: US 11,124,263 B2
(45) Date of Patent: Sep. 21, 2021

(54) BRAKE SYSTEM

(71) Applicant: HAYES BICYCLE GROUP INC., Mequon, WI (US)

(72) Inventor: John L Thomas, Cedarburg, WI (US)

(73) Assignee: Hayes Bicycle Group Inc., Mequon, WI (US)

( * ) Notice: Subject to any disclaimer, the term of this patent is extended or adjusted under 35 U.S.C. 154(b) by 0 days.

(21) Appl. No.: 16/449,441

(22) Filed: Jun. 23, 2019

(65) Prior Publication Data
US 2020/0010142 A1 Jan. 9, 2020

Related U.S. Application Data

(60) Provisional application No. 62/694,902, filed on Jul. 6, 2018.

(51) Int. Cl.
*B62L 3/02* (2006.01)
*B62L 1/00* (2006.01)

(52) U.S. Cl.
CPC .............. *B62L 3/023* (2013.01); *B62L 1/005* (2013.01)

(58) Field of Classification Search
CPC .......... B60T 7/04; B60T 7/102; B60T 11/046; B60T 11/16; B60T 11/18; B60T 11/22;
(Continued)

(56) References Cited

U.S. PATENT DOCUMENTS 6,804,961 B2 10/2004 Lumpkin
6,957,534 B2 10/2005 Lumpkin
(Continued)

*Primary Examiner* — Robert A. Siconolfi
*Assistant Examiner* — San M Aung
(74) *Attorney, Agent, or Firm* — Zimmerman Intellectual Property Services LLC

(57) ABSTRACT

A brake system for a vehicle such as a bicycle is disclosed. The brake system may comprise an improved master cylinder assembly configured for adjustment (such as adjustment of the stroke length, stroke start, etc.). The brake system may comprise a caliper assembly with an improved arrangement of flow paths configured to facilitate maintenance (such as to remove/bleed air and/or fluid from the body of the caliper assembly, inspection, etc.); the caliper assembly may also be configured for use with a tool (e.g. configured to fit in body to remove/bleed air and/or fluid from flow paths during maintenance). The master cylinder assembly may be configured (e.g. manufactured/produced, assembled, etc.) so that a setting and/or adjustment of the brake stroke and/or lever action/actuation can be provided by any one independent mechanism or one separate adjustment mechanism (e.g. without any other adjustment mechanism) or by a combination of adjustment mechanisms (e.g. in a combination with one or more adjustment mechanism); operation of a mechanism for setting and/or adjusting the brake stroke (e.g. travel of piston) may comprise engagement of a pushrod; the mechanism may comprise a feature configured to engage the pushrod (e.g. by direct action on the pushrod or a feature of the pushrod or by indirect action through a link, adjuster, etc. configured to engage the pushrod). The master cylinder assembly may be configured to be set and/or adjusted/tuned within the indicated range to provide an intended performance and/or "feel" for the operator at the brake lever (e.g. at an adjuster, link, etc.).

20 Claims, 15 Drawing Sheets

(58) Field of Classification Search
CPC .... B60T 11/165; B60T 11/224; B60T 11/232; B60T 11/236; B62L 1/00; B62L 1/005; B62L 1/10; B62L 1/12; B62L 1/14; B62L 1/16; B62L 3/00; B62L 3/02; B62L 3/023; B62K 23/00; B62K 23/02; B62K 23/06; B62M 9/121
USPC ........ 188/72.4, 344, 73.32, 24.11, 26, 24.15, 188/24.14, 24.22, 151 R, 196 BA, 196 M, 188/18 A, 359, 351, 152, 352, 181 A
See application file for complete search history.

(56) References Cited

U.S. PATENT DOCUMENTS

| | | | |
|---|---|---|---|
| 7,540,147 B2 | 6/2009 | Takizawa et al. | |
| 8,272,484 B1* | 9/2012 | Dennis | F16D 55/228 188/72.5 |
| 8,365,878 B2 | 2/2013 | Takizawa et al. | |
| 8,408,090 B2 | 4/2013 | Weiher | |
| 8,943,924 B2 | 2/2015 | Thomas | |
| 9,193,413 B1 | 11/2015 | Nago | |
| 9,290,232 B2 | 3/2016 | Snead | |
| 9,873,479 B2 | 1/2018 | Takizawa et al. | |
| 2005/0056508 A1* | 3/2005 | Laghi | B60T 11/232 188/344 |
| 2008/0011566 A1 | 1/2008 | Campbell et al. | |
| 2008/0245632 A1* | 10/2008 | Watarai | B62L 3/023 188/344 |
| 2009/0200121 A1* | 8/2009 | Takizawa | F16D 55/228 188/72.5 |
| 2012/0161420 A1* | 6/2012 | Eberlein | B60T 11/18 280/288.4 |
| 2015/0210345 A1* | 7/2015 | Noborio | F16D 65/0068 188/26 |
| 2015/0266540 A1* | 9/2015 | Snead | B62L 3/023 188/344 |
| 2016/0200392 A1* | 7/2016 | Bradley | B62L 3/023 188/344 |
| 2016/0347301 A1 | 12/2016 | Gallagher | |

\* cited by examiner

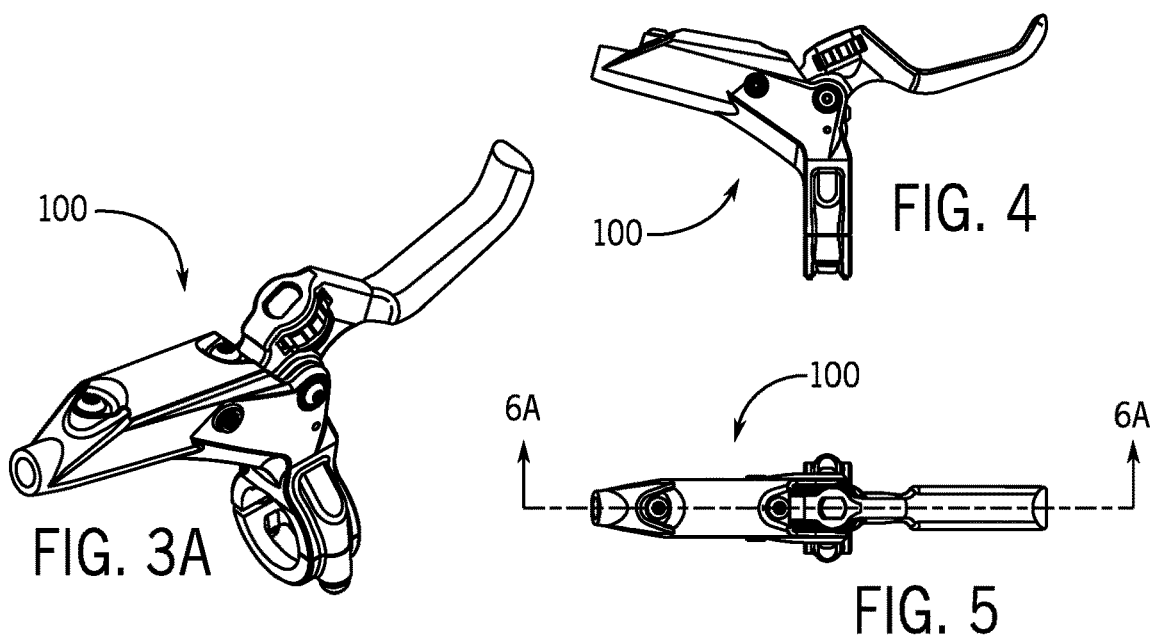
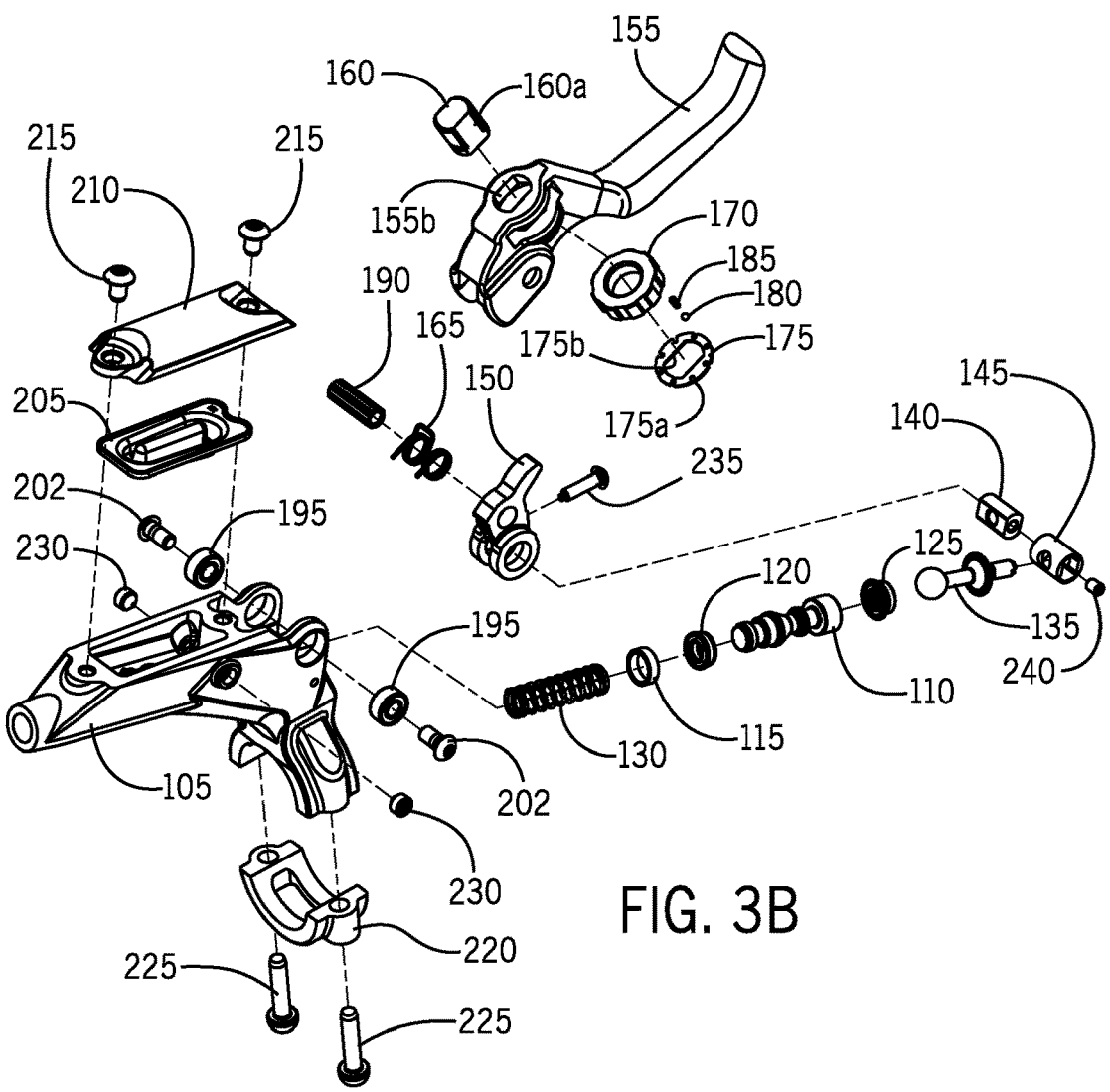

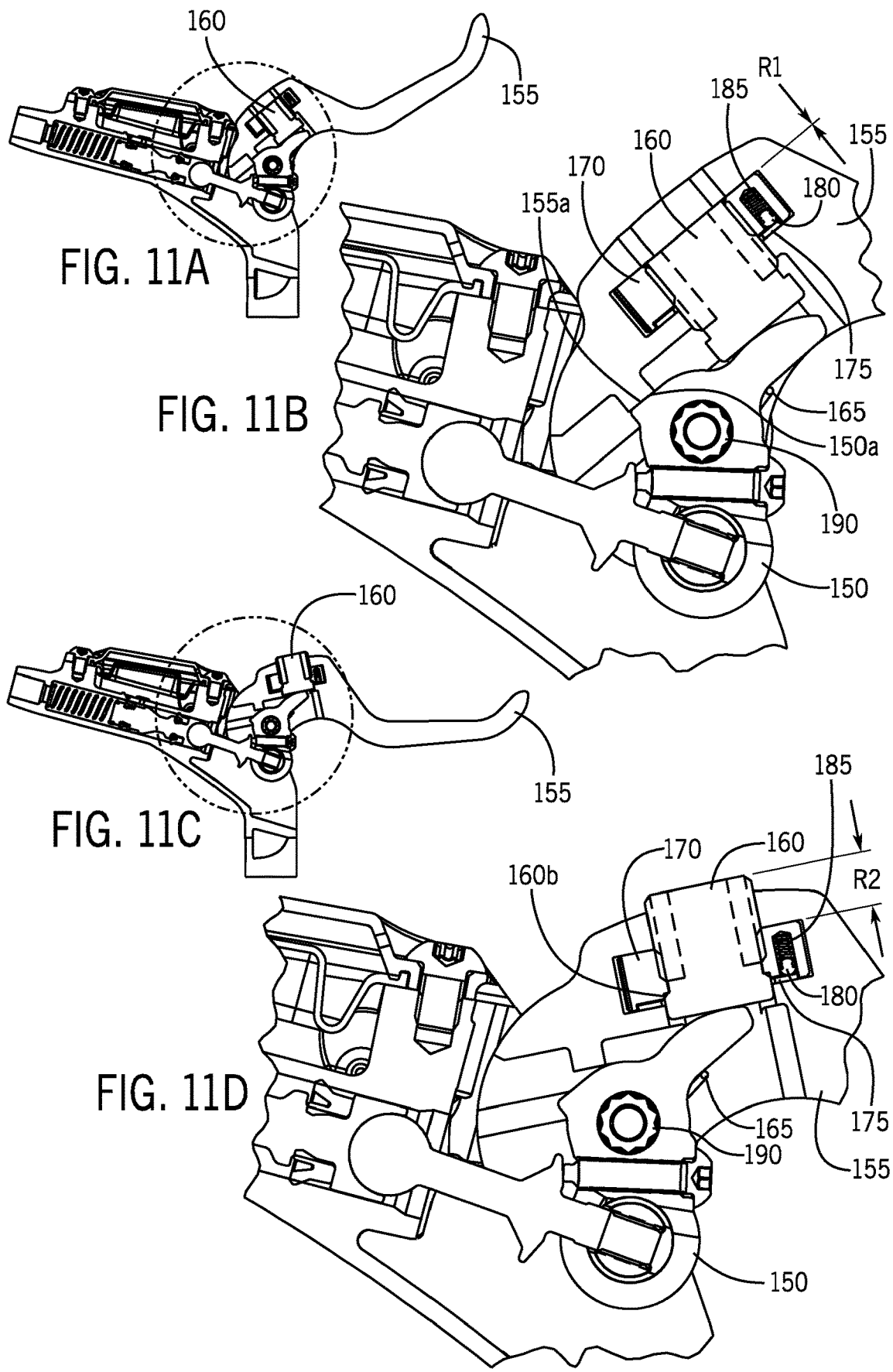

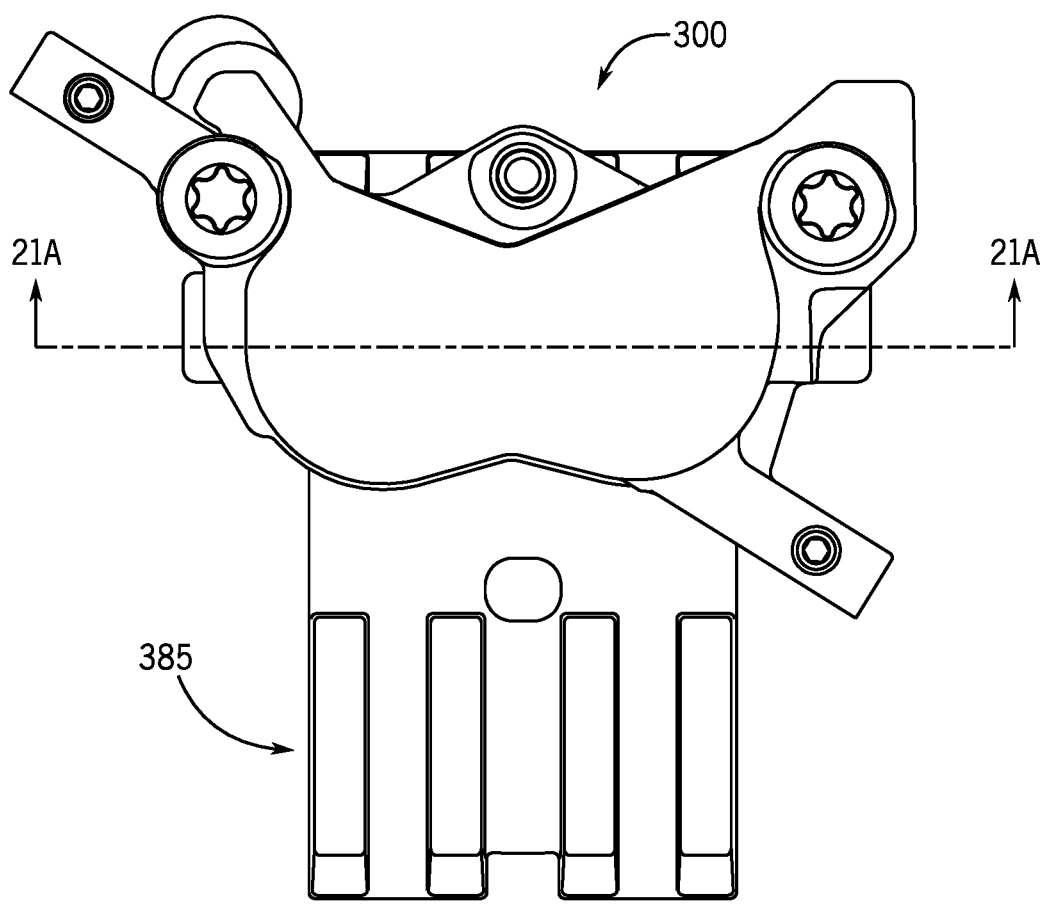
FIG. 20A
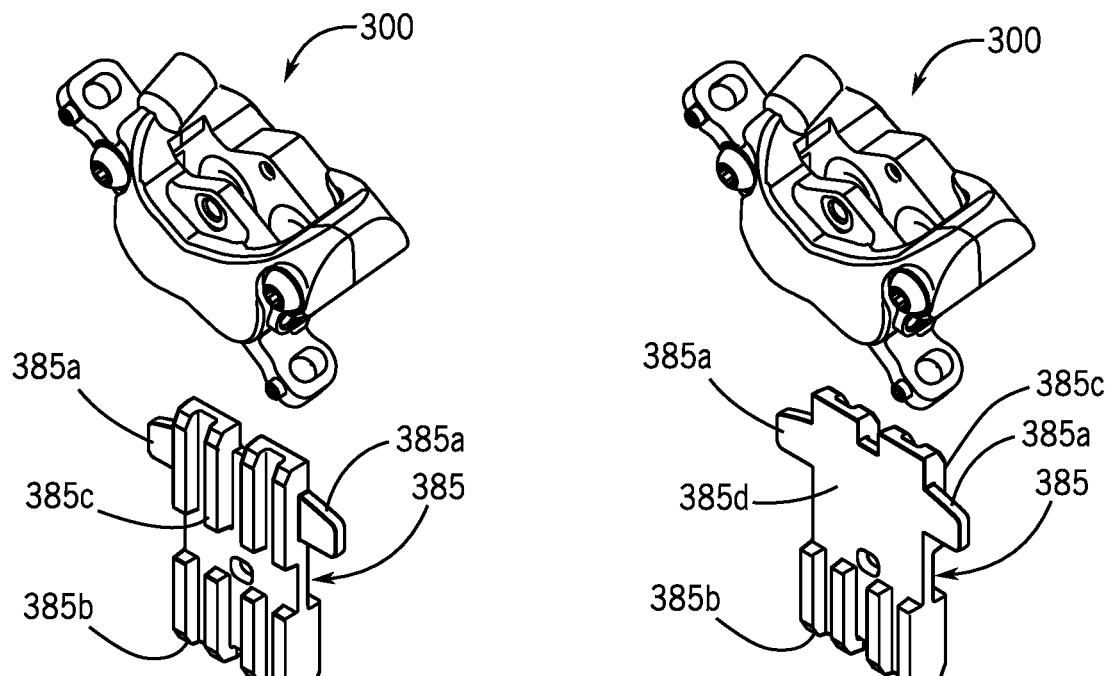
FIG. 20B
FIG. 20C

BRAKE SYSTEM

CROSS-REFERENCE TO RELATED APPLICATIONS

The present application is a non-provisional application of U.S. Provisional Patent Application No. 62/694,902 titled "BRAKE SYSTEM" filed Jul. 6, 2018.

The present application claims priority to and incorporates by reference in full the following patent application: U.S. Provisional Patent Application No. 62/694,902 titled "BRAKE SYSTEM" filed Jul. 6, 2018.

FIELD

The present invention relates to a brake system for a vehicle such as a bicycle.

The present invention relates to brake system comprising an improved master cylinder assembly.

The present invention relates to a brake system comprising an improved caliper assembly.

The present invention relates to a brake system for a vehicle such as a bicycle comprising an improved master cylinder assembly and/or an improved caliper assembly.

BACKGROUND

It is known to provide a brake system for a vehicle such as a bicycle. It is also known to provide a brake system comprising a master cylinder assembly and a caliper assembly.

A master cylinder assembly for a known brake system may comprise a set of brake levers to actuate the operation of the braking function for the bicycle (e.g. one for each of the front wheel and the rear wheel). In such known brake systems, each brake lever may be provided at a generally fixed position notwithstanding the advantages of providing for adjustment of the position and/or of the sensitivity/lag of the braking function in operation and/or of adjustment of possible variation in position/sensitivity of each brake lever.

A caliper assembly for a known brake system may comprise a set of pistons in operation under control (e.g. by hydraulic/brake fluid) of the master cylinder assembly (e.g. at each brake lever); the caliper assembly of the brake system (including each set of pistons) may from time to time require maintenance (e.g. removal/bleed of air that may be entrapped, drain old fluid, refill of new fluid, etc.) and/or inspection; for certain known brake systems, such maintenance may require actions that are relatively time-consuming/inefficient.

It would be advantageous to provide a brake system for a vehicle such as a bicycle comprising an improved master cylinder assembly and/or an improved caliper assembly.

It would be advantageous to provide a brake system for a vehicle such as a bicycle comprising an improved master cylinder assembly configured to allow for setting of the initial position of the piston for performance and preference/comfort of the operator.

It would be advantageous to provide a brake system for a vehicle such as a bicycle comprising an improved master cylinder assembly having multiple adjustments for performance and preference/comfort of the operator.

It would be advantageous to provide an improved caliper assembly to facilitate convenient maintenance (e.g. removal/bleed of air that may be entrapped, drain/refill/replace fluid, etc.).

It would be advantageous to provide an improved caliper assembly provided with a tool to facilitate convenient maintenance (e.g. removal/bleed of air that may be entrapped, drain/refill/replace fluid, etc.), inspection, etc.

SUMMARY

The present invention relates to brake system comprising an improved master cylinder assembly.

The present invention relates to a brake system comprising an improved caliper assembly.

The present invention relates to a brake system for a vehicle such as a bicycle comprising an improved master cylinder assembly and/or an improved caliper assembly.

The present invention relates to a brake system configured to be operable by an actuator comprising a caliper assembly and a master cylinder assembly. The master cylinder assembly may comprise a body and a piston configured to move from an initial stroke position along a full stroke within the body to actuate braking action at the caliper assembly and a pushrod configured to engage the piston and a link actuated by the actuator and configured to engage the pushrod into engagement with the piston; the initial stroke position of the piston may be configured to be set by a feature acting at the link engaged at the pushrod and configured to determine a distance of movement by the actuator before braking action is actuated at the caliper assembly. The caliper assembly may comprise a body configured to provide a series of flow paths to facilitate maintenance by facilitating flow of fluid within and from the body; the caliper assembly further may comprise plugs to direct fluid within and from the body. The caliper assembly may be configured for use of a tool to facilitate maintenance.

The present invention relates to a brake system comprising a master cylinder assembly. The master cylinder assembly may comprise a body and a piston configured to move from an initial stroke position along a stroke within the body and a pushrod configured to engage the piston and a link coupled within the body and configured to engage the pushrod. The initial stroke position of the piston may be configured to be set by a feature acting at the link engaged at the pushrod. The feature may comprise a threaded end on the pushrod and a bushing on the link; the initial stroke position of the piston may be set by relative position of the threaded end of the pushrod to the bushing on the link. The initial stroke position of the piston may be configured to be adjusted by the feature. The initial stroke position of the piston may be configured to be set by contact between the feature and the pushrod; the feature may be on the link; and the initial stroke position of the piston may be configured to be set by the feature on the link as a stop for the pushrod. The initial stroke position of the piston may be configured to be adjusted by contact between the feature and the pushrod. The feature may be on the link; the feature on the link may be configured to engage the pushrod as a stop; and the initial stroke position of the piston may be configured to be adjusted by the feature on the link as a stop for the pushrod. The system may comprise an adjuster; the feature may be on the pushrod; and the adjuster may be configured to be adjusted to engage the feature on the pushrod to set the initial stroke position of the piston. The adjuster may comprise an adjuster screw; the feature on the pushrod may comprise a flange. The system may comprise an adjuster; the feature may be on the pushrod; contact by the adjuster may comprise contact with the feature on the pushrod. The adjuster may be configured to adjust the initial stroke position of the piston by engagement with the pushrod. The initial stroke position of the piston may determine a length of stroke of the piston before braking action at a caliper assembly. The stroke of the piston may comprise a full stroke set by contact between the pushrod and the body.

The present invention relates to a brake system configured to be actuated by an actuator comprising a master cylinder assembly. The master cylinder assembly may comprise a body and a piston configured to move from an initial stroke position along a stroke within the body and a link actuated by the actuator and configured to actuate the piston and a mechanism configured to adjust an initial position of the actuator; the mechanism may comprise an adjuster configured to contact the link. The link may comprise a pivot link coupled within the body. The adjuster may comprise a slide having a threaded portion and an unthreaded portion. The adjuster may comprise a detent mechanism. The actuator may comprise a brake lever; the mechanism may be configured to adjust the initial position of the brake lever.

The present invention relates to a brake system comprising a master cylinder assembly comprising a lever and a piston and configured to facilitate adjustment of the stroke (e.g. start/cut-off of the braking action/stroke of the lever and/or piston actuated by the lever) by at least one of adjustment of the position of the pushrod acting on the piston and/or adjustment of an adjuster screw acting upon the pushrod acting on the piston and/or adjustment of a slide/bolt configured to adjust the default position the lever.

The present invention relates to a brake system comprising a caliper assembly comprising a body and a piston assembly and configured to facilitate maintenance including the removal/bleed of undesirable matter/material such as air from the body.

The present invention relates to a brake system comprising a caliper assembly comprising a body and a piston assembly and configured with flow paths to facilitate maintenance including the removal/bleed of undesirable matter/material such as air from the body and/or inspection/lubrication of the piston assembly.

The present invention relates to a brake system comprising a caliper assembly comprising a body and a piston assembly and configured for use with a tool to facilitate maintenance including the removal/bleed of undesirable matter/material such as air from the body and/or inspection/lubrication of the piston assembly; the tool may be configured to fit within the body of the caliper assembly and may comprise features such as a set of ridges and a flat section configured to engage with the body and piston assembly to facilitate maintenance.

The present invention relates to a brake system configured to be operable by an actuator; the brake system may comprise a caliper assembly and a master cylinder assembly; the master cylinder assembly may comprise a body and a piston configured to move from an initial stroke position along a full stroke within the body to actuate braking action at the caliper assembly and a pushrod configured to engage the piston and a link actuated by the actuator and configured to engage the pushrod into engagement with the piston; the initial stroke position of the piston may be configured to be set by a feature engaged at the pushrod and configured to determine a distance of movement by the actuator before braking action is actuated by the piston at a caliper assembly. The initial stroke position of the piston may be configured to be set by contact between the feature and the pushrod. The initial stroke position of the piston may be configured to be adjusted by contact between the feature and the pushrod. The caliper assembly may comprise a body configured to provide a series of flow paths to facilitate maintenance by facilitating flow of fluid within and from the body. The caliper assembly may be configured for use of a tool to facilitate maintenance. The caliper assembly further may comprise plugs to direct of fluid within and from the body.

The present invention relates to a brake system comprising a master cylinder assembly comprising a body and a piston configured to move from an initial stroke position along a stroke within the body and a pushrod configured to engage the piston and a link coupled within the body and configured to engage the pushrod; the initial stroke position of the piston may be set by a feature engaged at the pushrod. The initial stroke position of the piston may be configured to be adjusted by the feature. The initial stroke position of the piston may be configured to be set by contact between the feature and the pushrod. The initial stroke position of the piston may be configured to be adjusted by contact between the feature and the pushrod. The feature may be on the link; and the initial stroke position of the piston may be configured to be set by the feature on the link as a stop for the pushrod. The feature may be on the link; the feature on the link may be configured to engage the pushrod as a stop; and the initial stroke position of the piston may be configured to be set by the feature on the link as a stop for the pushrod. The feature may be on the link; the feature on the link may be configured to engage the pushrod as a stop; and the initial stroke position of the piston may be configured to be adjusted by the feature on the link as a stop for the pushrod. The system may comprise an adjuster; the feature may be on the pushrod; and the adjuster may be configured to be set to engage the feature on the pushrod to set the initial stroke position of the piston. The system may comprise an adjuster; the feature may be on the pushrod; and the adjuster may be configured to be adjusted to engage the feature on the pushrod to set the initial stroke position of the piston. The adjuster may comprise an adjuster screw. The feature on the pushrod may comprise a flange. The adjuster may be configured to contact the pushrod. The feature may be on the pushrod; wherein contact by the adjuster may comprise contact with the feature on the pushrod. The adjuster may be configured to set the initial stroke position of the piston by engagement with the pushrod. The adjuster may be configured to adjust the initial stroke position of the piston by engagement with the pushrod. The initial stroke position of the piston set by a feature engaged at the pushrod may be configured to determine a length of stroke of the piston before braking action at a caliper assembly. The feature may comprise a threaded end on the pushrod and a bushing on the link; wherein the initial stroke position of the piston may be set by relative position of the threaded end of the pushrod to the bushing on the link. The stroke of the piston may comprise a cutoff stroke set by contact between the pushrod and the piston. The stroke of the piston may comprise a full stroke set by contact between the pushrod and the body.

The present invention relates to a brake system configured to be actuated by an actuator and comprising a master cylinder assembly; the master cylinder system may comprise a body and a piston configured to move from an initial stroke position along a stroke within the body; and a pushrod configured to engage the piston and a link actuated by the actuator and configured to engage the pushrod into engagement with the piston and a mechanism configured to set an initial position of the link; the initial stroke position of the piston may be configured to be set by a feature engaged at the pushrod. The mechanism may be configured to adjust the initial position of the link. The mechanism may comprise an adjuster configured to contact the link. The mechanism may comprise a slide adjuster. The link may comprise a pivot link coupled within the body. The mechanism may comprise a slide having a threaded portion and an unthreaded portion. The mechanism may comprise a detent mechanism. The mechanism may be configured to set the initial position of the link independently of the initial stroke position of the piston set by the feature engaged at the pushrod. The mechanism may comprise a torsion spring. The actuator may comprise a brake lever. The mechanism may be configured to adjust the dead stroke of the brake lever. The mechanism may be configured to adjust reach for the brake lever. The initial stroke position of the piston may be configured to be adjusted by the feature engaged at the pushrod.

FIGURES

FIG. 3A is a schematic perspective view of a master cylinder assembly for a brake system according to an exemplary embodiment.

FIG. 3B is a schematic exploded perspective view of a master cylinder assembly for a brake system according to an exemplary embodiment.

FIG. 4 is a schematic side elevation view of a master cylinder assembly for a brake system according to an exemplary embodiment.

FIG. 5 is a schematic top plan view of a master cylinder assembly for a brake system according to an exemplary embodiment.

FIGS. 11A and 11C are schematic side elevation cross-section views of a master cylinder assembly for a brake system according to an exemplary embodiment.

FIGS. 11B and 11D are schematic partial side elevation cross-section views of a master cylinder assembly for a brake system according to an exemplary embodiment.

FIG. 20A is a schematic front elevation view of a caliper assembly and tool for a brake system according to an exemplary embodiment.

FIGS. 20B and 20C are a schematic perspective views of a caliper assembly and tool for a brake system according to an exemplary embodiment.

TABLES

TABLE A is a reference symbol list for the bicycle with brake system according to an exemplary embodiment.

TABLE B is a reference symbol list for the master cylinder assembly of the brake system according to an exemplary embodiment.

TABLE C is a reference symbol list for the caliper assembly of the brake system according to an exemplary embodiment.

DESCRIPTION

Figure 1:
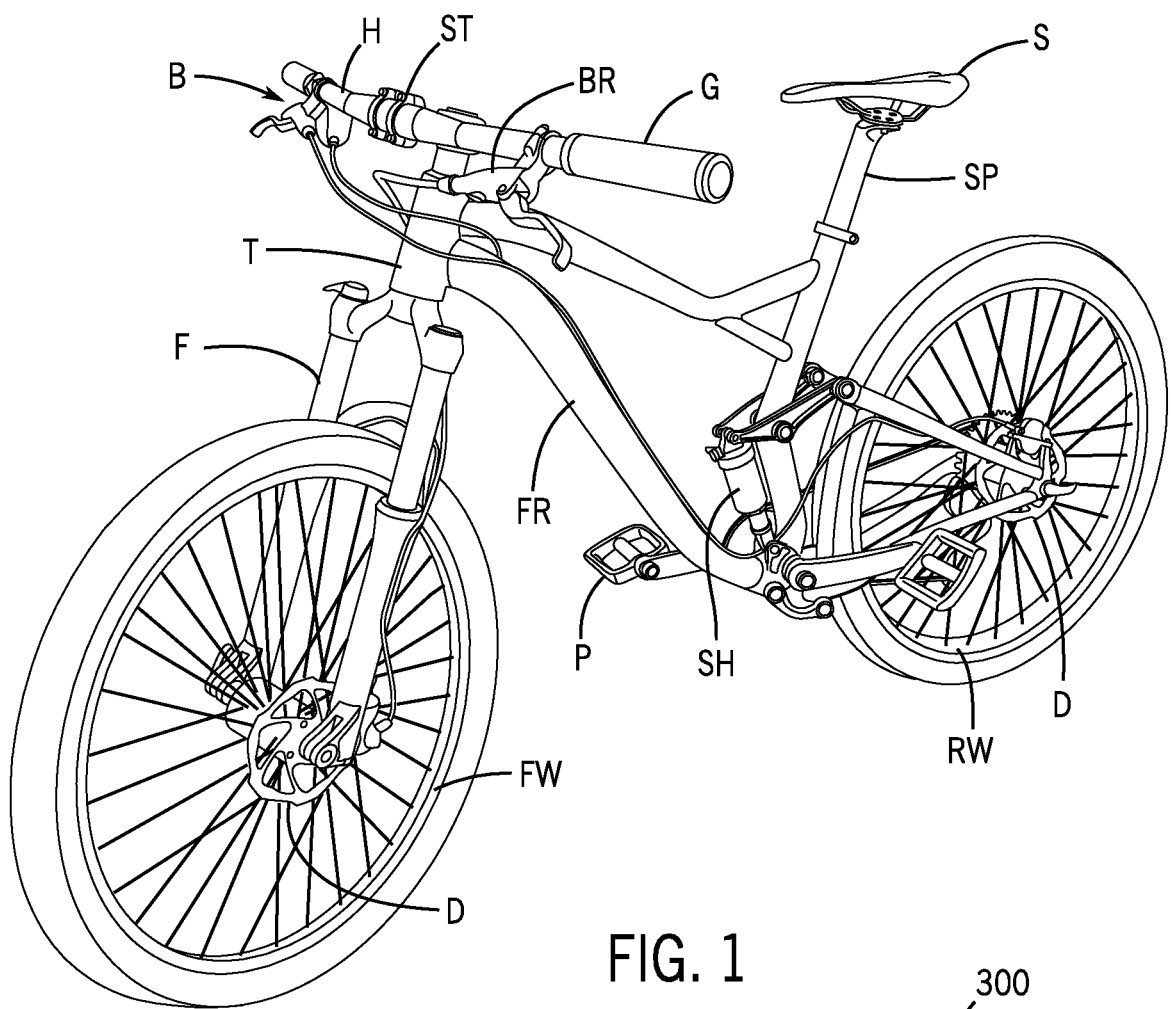
FIG. 1 is a schematic perspective view of a bicycle with a brake system according to an exemplary embodiment.

Referring to FIG. 1, a bicycle B (such as a mountain bike) is shown schematically according to an exemplary embodiment providing an arrangement of parts/components including a frame FR with a steering tube T and a seat post SP (with seat S) and a set of wheels comprising front wheel FW with a front fork assembly F and rear wheel RW coupled to the frame FR and through a rear shock absorber SH (of a suspension system) and a set of pedals P; the bicycle provides handlebar H (coupled by stem ST to front wheel FW through front fork assembly F and through steering tube T) with a grip G and controls for a brake system BR coupled to a brake disc D (e.g. rotor at/on each of front wheel FW and rear wheel RW).

Figure 2:
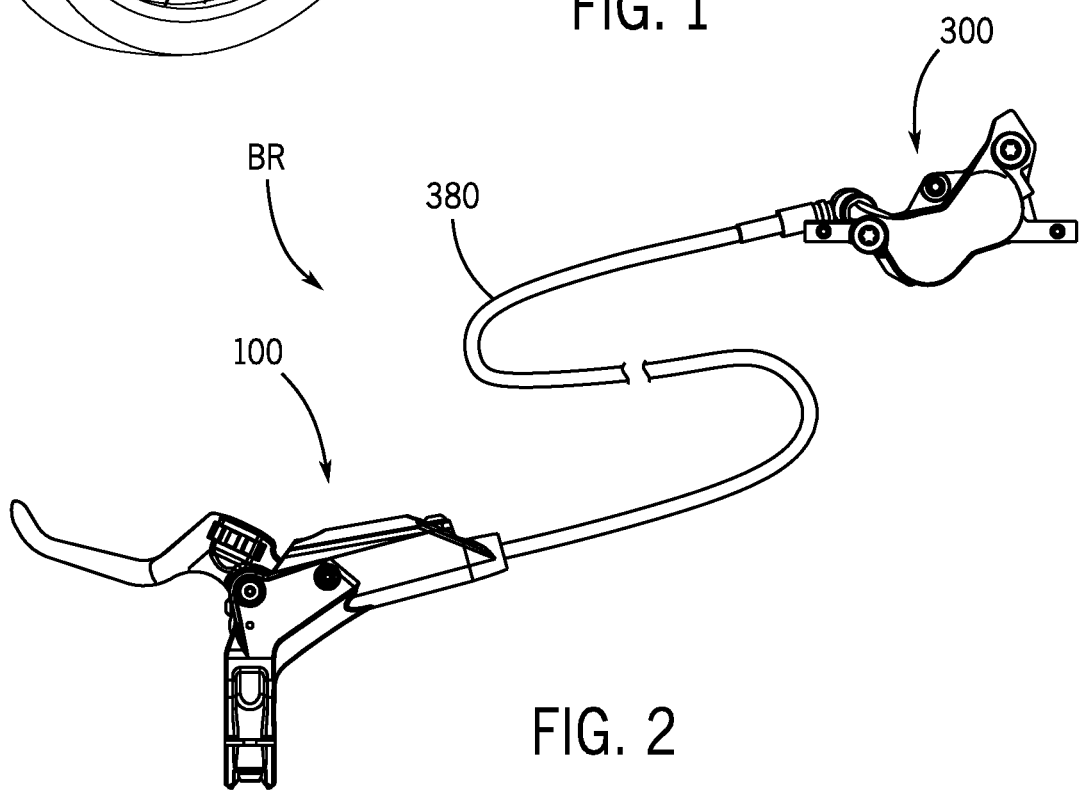
FIG. 2 is a schematic perspective view of a master cylinder assembly and a caliper assembly for a brake system for a vehicle such as a bicycle according to an exemplary embodiment.

According to an exemplary embodiment shown schematically in FIG. 2, components of a brake system/assembly for a bicycle may comprise a master cylinder assembly 100 configured to be mounted on the handlebar and a caliper assembly 300 configured to be mounted on a fork structure (e.g. fork for wheel) or frame to engage the brake rotor/disc and coupled by a tube 380 (e.g. providing a passage for flow of hydraulic/brake fluid to actuate the braking function under operator control of the master cylinder assembly). See also FIGS. 3A-3B to 11A-11D (exemplary embodiment of master cylinder assembly) and FIGS. 14A-14C to 21A-21C (exemplary embodiment of caliper assembly).

Brake System—Master Cylinder Assembly

As shown schematically according to an exemplary embodiment in FIGS. 1 and 2, the brake system BR may comprise a master cylinder assembly 100.

As shown schematically in FIGS. 3A-3B, the master cylinder assembly 100 may comprise a body 105 with a cover shown as plate 210 (secured by screws 215) for a top chamber shown as reservoir configured to hold bladder 205 (e.g. separating air and hydraulic/brake fluid) (and with a set of plugs shown bleed plugs 230) and configured to be secured to the handlebar of a bicycle with a clamp assembly shown as comprising a clamp section 220 and screws 225.

As shown schematically in FIGS. 3A-3B, body 105 comprises an internal chamber or bore (for hydraulic/brake fluid in communication through a hole 105b with the top chamber/reservoir containing hydraulic/brake fluid and bladder to contain air) configured to contain a piston system/arrangement comprising a piston 110 with a spring 130 and a bushing 115 and a primary cup 120 and a secondary cup 125 engaged with a pushrod 135 secured on a fitting comprising a nut 140 contained in a bushing 145 and retained with a set screw 240. See also FIGS. 6A-6C.

As shown schematically according to an exemplary embodiment in FIGS. 3A-3B, 4-5 and 6A-6C, the master cylinder assembly 100 may comprise a lever assembly comprising a lever 155 coupled to body 105 and configured to actuate a link 150 engaged with the piston assembly; the lever assembly is configured with an adjustment system comprising a peg/slide 160 (e.g. with flat 160a configured to be fit in flat 155b of the lever 155) and an adjuster mechanism providing a ring/knob 170 configured in a detent arrangement with a plate/washer 175 (with flat 160a of the slide 160 configured to be fit in flat 175b of the plate/washer 175) with ball 180 and spring 185 (e.g. providing a set of adjustment positions 175a for rotation of knob 170); link 150 is pivotally coupled to body 105 on a shaft/axle shown as pivot nut 190 secured with a set of pins shown as bolts 202 on bearings 195 (e.g. press-fit into the body 105) with a spring arrangement shown as comprising torsion spring 165 (e.g. biasing spring) and retained with an adjuster screw 235. See also FIGS. 11A-11D.

Figure 6A:
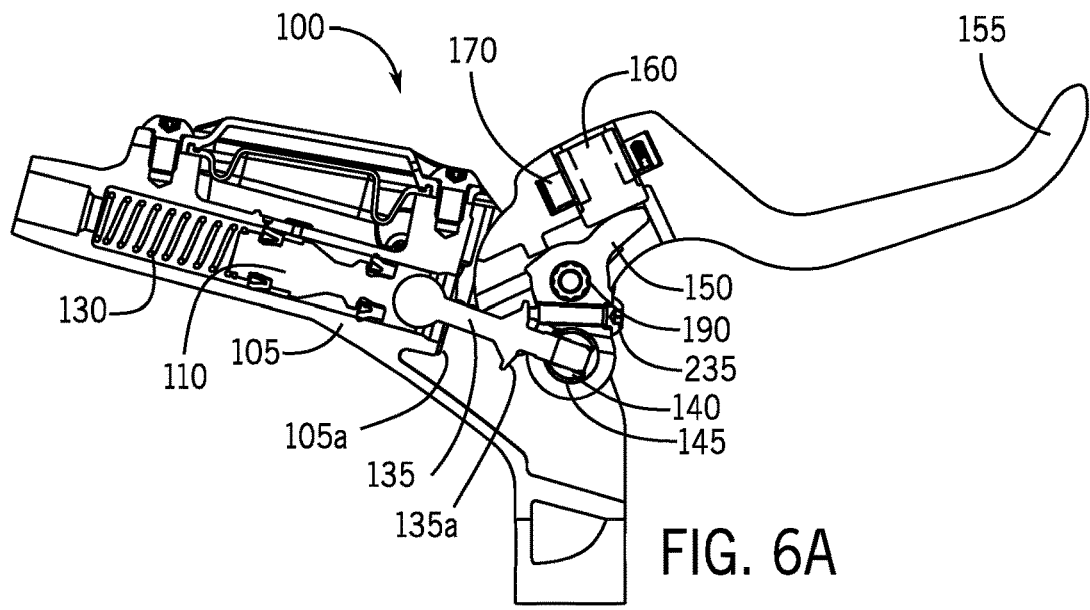
FIGS. 6A to 6C are schematic side elevation cross-section views of a master cylinder assembly for a brake system according to an exemplary embodiment.
Figure 6B:
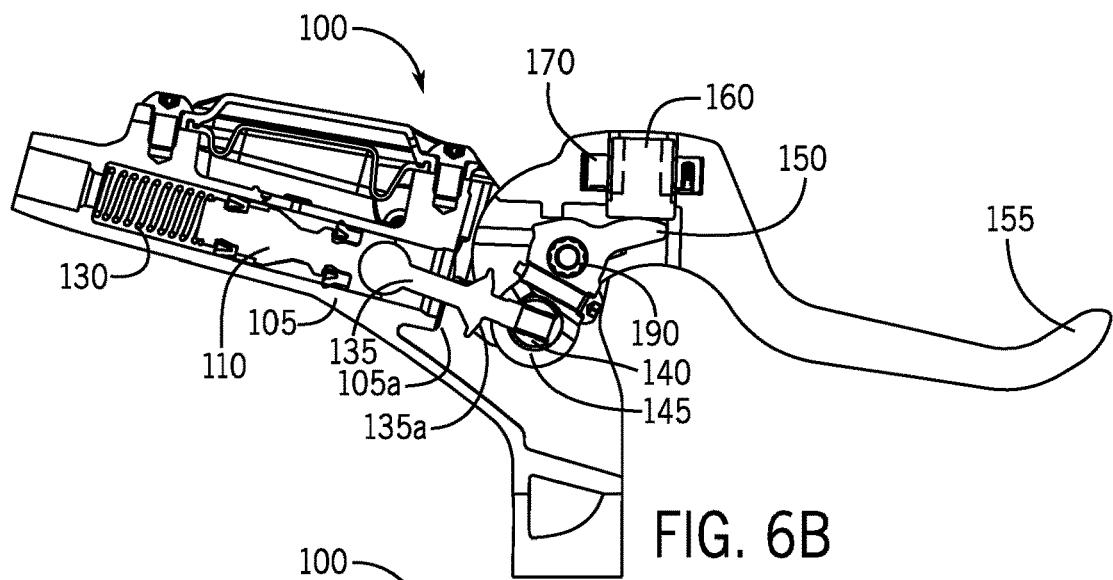
Figure 6C:
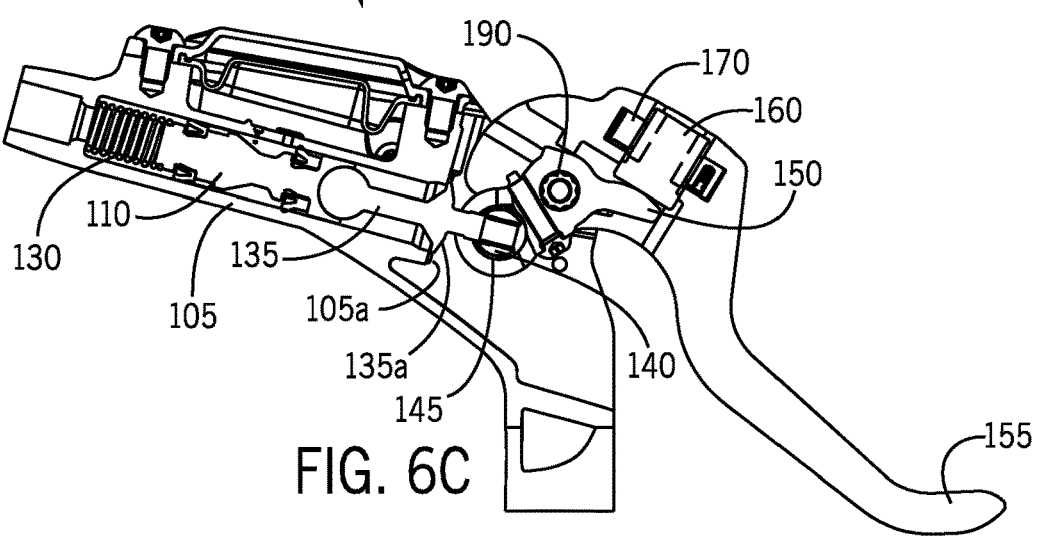
Figure 13:
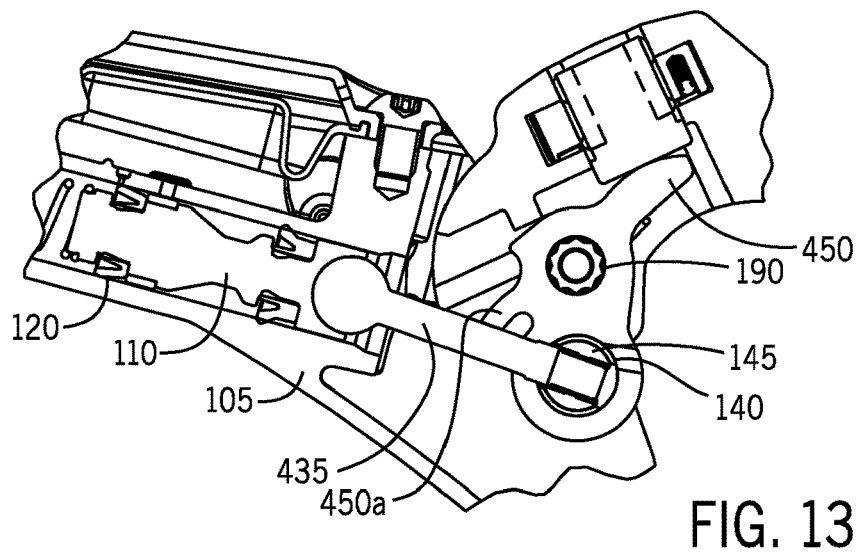
FIG. 13 is a schematic partial side elevation cross-section views of a master cylinder assembly for a brake system according to an exemplary embodiment.
Figure 14A:
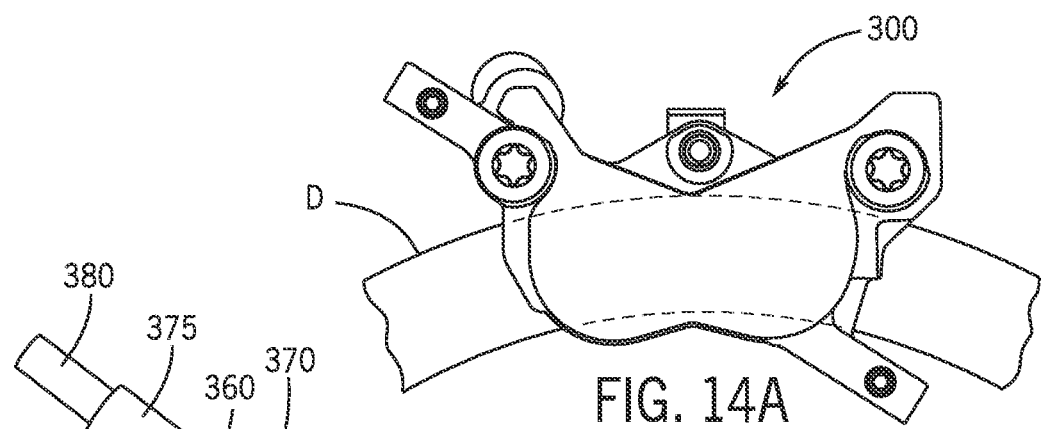
FIG. 14A is a schematic side elevation view of a caliper assembly for a brake system according to an exemplary embodiment.

As shown schematically according to an exemplary embodiment in FIGS. 6A-6C, the master cylinder assembly is operated (e.g. to provide braking function) by actuation of the lever 155 operating through slide 160 (against spring 165) on link 150 on bushing 145 on nut 140 on pushrod 135 to advance piston 110 against spring 130 into the bore in body 105 (see FIGS. 6B and 6C) and to transmit hydraulic/brake fluid to a caliper assembly to effectuate the braking function on the wheel (see FIGS. 1, 2 and 14A). See also FIGS. 12A-12B and 13 (master cylinder assembly 400 with piston arrangement including piston 110 and with pushrod 435 with link 450).

As shown schematically according to an exemplary embodiment in FIGS. 6A-6C, the master cylinder assembly is configured for setting/adjustment of the brake stroke (e.g. start, travel, etc.); as indicated schematically in FIG. 6A, the start of the stroke of the brake may be set by the position at which a feature engages the pushrod 135 (e.g a feature such as on link 150 and/or a feature such as an adjuster/screw 235 configured to engage the pushrod 135 (e.g. on a feature such as flange 135a)); the feature on and/or connected to the link may be formed/shaped and configured so that setting/adjustment of the brake stroke and/or lever action/actuation may be provided by direct engagement; as indicated schematically, the feature may be configured to engage the pushrod (e.g. on a surface of the pushrod and/or a feature such as the flange of the pushrod, etc. and with/without the adjustment screw/adjuster). As shown schematically in FIG. 6C, the full stroke limit may be set by the position at which the flange 135a of the pushrod 135 engages the end surface 105a of the body 105 (e.g. as a mechanical stop). As indicated schematically in FIG. 3B, set screw 240 is provided to retain the adjustment setting of pushrod 135 (e.g. in position as adjusted).

As indicated schematically according to an exemplary embodiment in FIGS. 3B, 7A-7B, 9A-9B and 11A-11D, the master cylinder assembly is configured for setting/adjustment of the lever action/actuation (e.g. sensitivity, feel, travel before engagement, dead zone/lag, etc.). According to an exemplary embodiment, the lever action/actuation for master cylinder assembly can be adjusted so that an operator can balance (e.g. according to purpose, preference, etc.) such considerations as producing intended similarity or variation in sensitivity/feel of each brake lever (e.g. control for braking at front/rear wheel), dead zone/travel of the brake lever before the operation of the braking function is initiated, etc.

Figure 8:
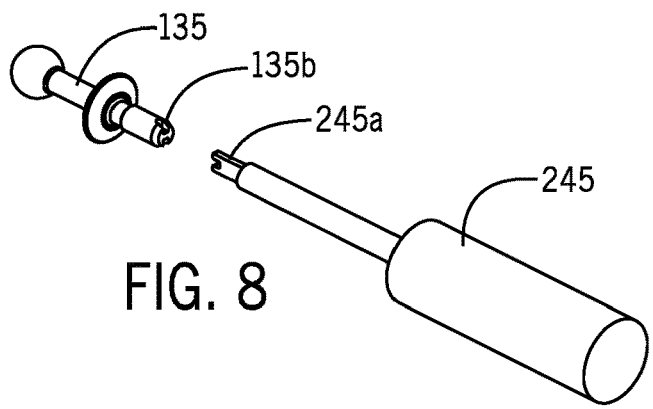
FIG. 8 is a schematic perspective view of a tool for adjustment of a master cylinder assembly of a brake system according to an exemplary embodiment.
Figure 7A:
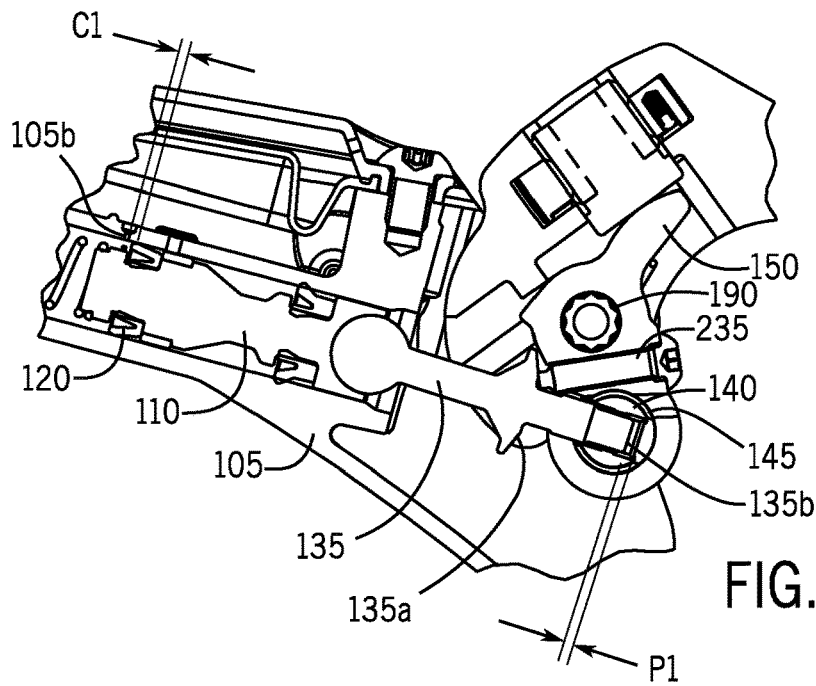
FIGS. 7A and 7B are schematic partial side elevation cross-section views of a master cylinder assembly for a brake system according to an exemplary embodiment.
Figure 7B:
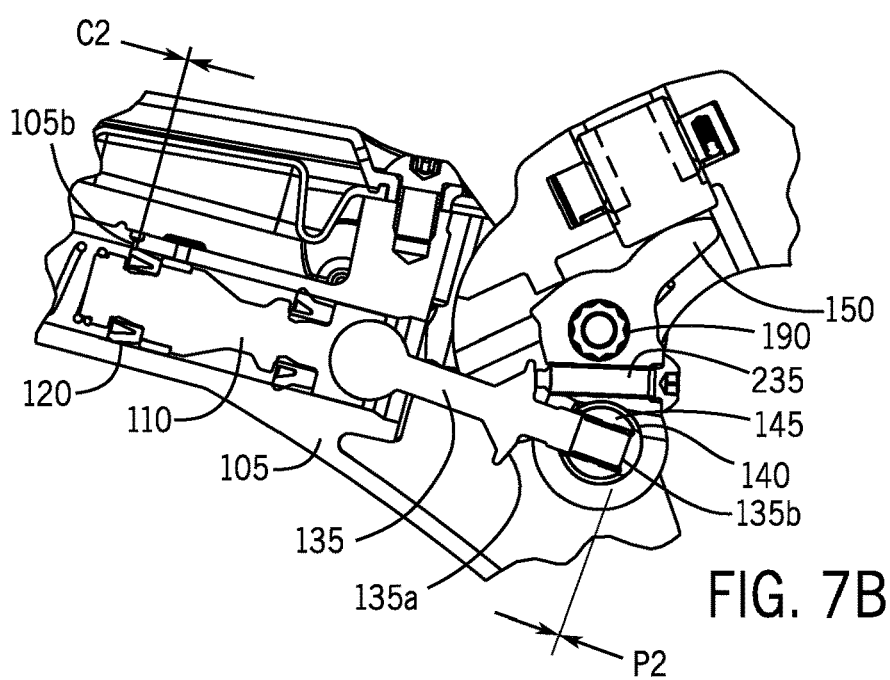

As indicated schematically according to an exemplary embodiment in FIGS. 7A-7B and 8, the master cylinder assembly is configured for setting/adjustment of the lever action/actuation by adjustment of the cutoff stroke (C) of the piston 110 with threaded adjustment of the position (P) of the pushrod 135 at end/recess 135b (e.g. adjusted position in threaded bushing 140 by rotation/engagement with end 245a of tool 245); with pushrod 135 adjusted to position P1 the piston 110 will have a cutoff stroke C1 (e.g. representative of a factory default setting with a relatively small dead zone/lag before engagement) (see FIG. 7A); with pushrod 135 adjusted to position P2 the piston 110 will have a reduced cutoff stroke C2 (e.g. virtually no lag before engagement) (see FIG. 7B).

Figure 10:
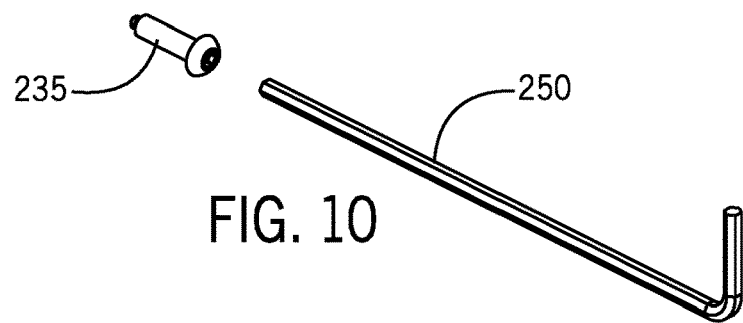
FIG. 10 is a schematic perspective view of a tool for adjustment of a master cylinder assembly of a brake system according to an exemplary embodiment.
Figure 9A:
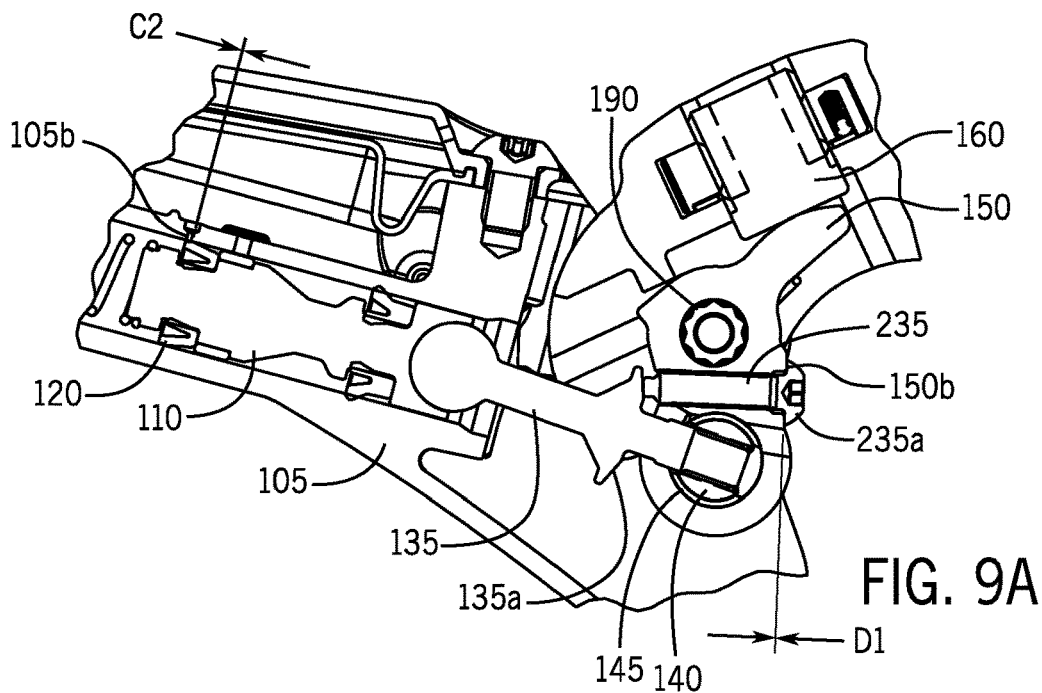
FIGS. 9A and 9B are schematic partial side elevation cross-section views of a master cylinder assembly for a brake system according to an exemplary embodiment.
Figure 9B:
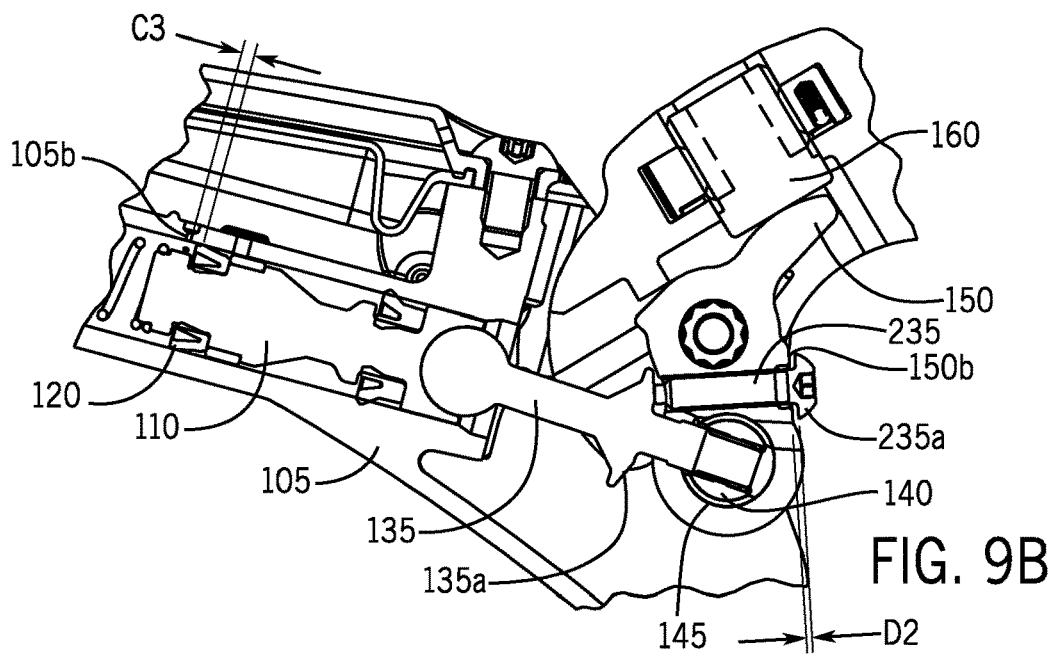

As indicated schematically according to an exemplary embodiment in FIGS. 9A-9B and 10, the master cylinder assembly is configured for adjustment of the lever action/actuation by adjustment of the cutoff stroke (C) of the piston 110 with adjustment of the pushrod 135 by threaded adjustment of the relative position (D) of adjuster screw 235 (e.g. adjusted by engagement with end of tool 250 to a relative position indicated as between head 235a of the adjuster screw 235 and surface 150b of the link 150); with pushrod 135 adjusted at flange 135a by adjuster screw at relative position D1 the piston 110 will have a reduced cutoff stroke C2 (see FIG. 9A indicating an adjustment limit/stop with head 235a of adjuster screw engaged in contact at surface 150b of link 150); with pushrod 135 adjusted at flange 135a by adjuster screw at relative position D2 the piston 110 will have a lengthened cutoff stroke C3 (e.g. greater lag before engagement) (see FIG. 9B).

As indicated schematically according to an exemplary embodiment in FIGS. 11A-11B and 11C-11D, the master cylinder assembly is configured for adjustment of the lever action/actuation (e.g. default position of lever 155) by threaded adjustment of the position (R) of slide 160 by adjuster knob 170 (e.g. adjusted by the ball/spring detent mechanism for the rotary adjuster knob) for engagement with link 150 and actuation of pushrod 135 and piston 110. Referring to FIGS. 11A and 11B, with slide 160 adjusted to a fully retracted position R1 by adjuster knob 170 (see FIG. 11B indicating an adjustment/limit stop with shoulder 155a of lever 155 engaged in contact at surface 150a of link 150) the default position of lever 155 is in effect fully extended relative to the body 105 (see FIGS. 11A-11B) (e.g. shorter distance for operator hand/fingers before engagement at the lever). Referring to FIGS. 11C and 11D, with slide 160 adjusted to a fully extended position R2 by adjuster knob 170 (see FIG. 11D indicating an adjustment limit/stop by unthreaded flange section 160b of slide 160) the default position of lever 155 is in effect fully retracted relative to the body 105 (see FIGS. 11C-11D) (e.g. greater distance for operator hand/fingers before engagement at the lever) (see FIG. 9B). See also FIGS. 9A-9B (showing slide 160 in an intermediate position of adjustment between position R1 and position R2).

As indicated schematically in FIGS. 3B and 6A-6C, 7A-7B, 9A-9B and 11A-11D, according to an exemplary embodiment the master cylinder assembly may be configured (e.g. manufactured/produced, assembled, etc.) so that adjustment of the brake stroke and/or lever action/actuation can be provided by any one independent or separate adjustment mechanism (e.g. without any other adjustment mechanism) or by a combination of adjustment mechanisms (e.g. in a combination with one or more adjustment mechanism) or by variations in the configuration one (or more) of the adjustment mechanisms; for example, according to an exemplary embodiment, the link 150 (e.g. by a feature such as contact point on the link shown as link 150) and/or the pushrod 135 (e.g. by a feature such as contact point such as a flange or other feature on the pushrod shown as flange 135a of pushrod 135) may be formed/shaped and configured so that adjustment of the brake stroke and/or lever action/actuation may be provided by direct engagement of a surface of the link and the pushrod (e.g. with/without the adjustment screw/adjuster, with/without the flange, etc,).

Figure 12A:
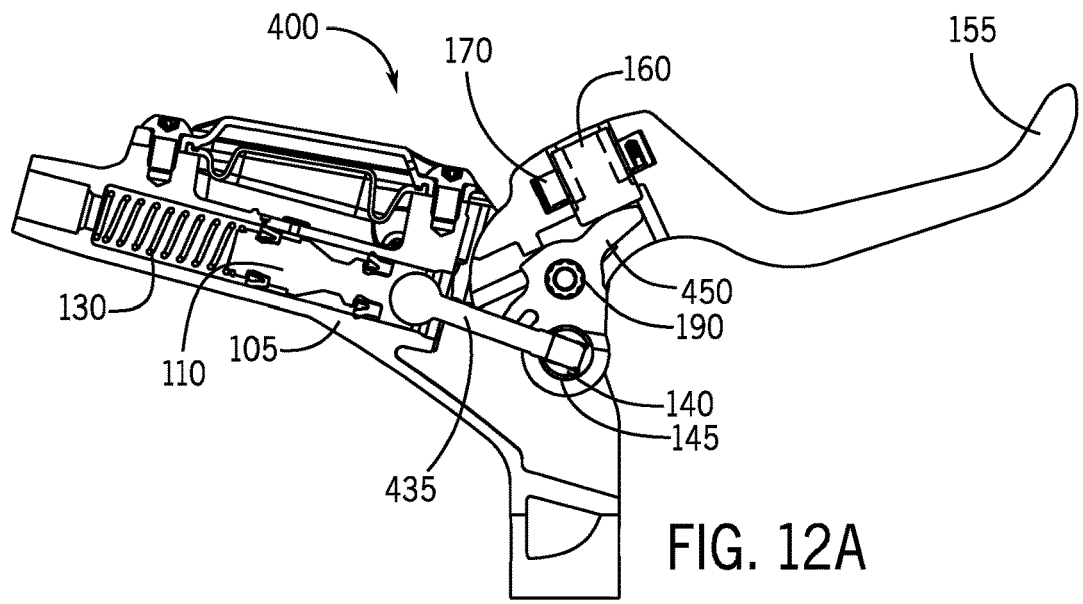
FIGS. 12A and 12B are schematic side elevation cross-section views of a master cylinder assembly for a brake system according to an exemplary embodiment.
Figure 12B:
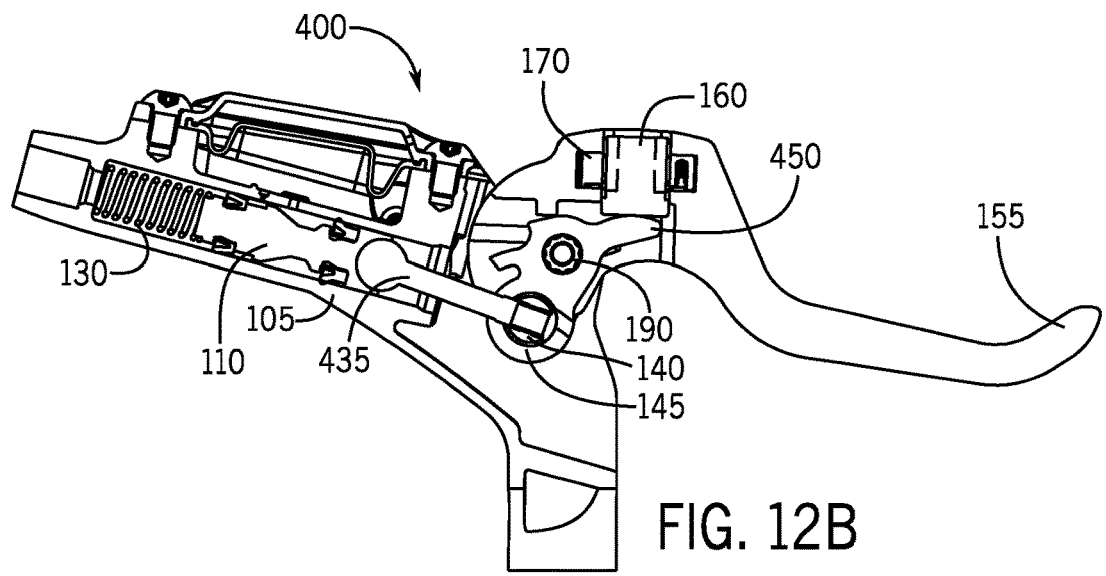

As shown schematically according to an exemplary embodiment in FIGS. 12A-12B and 13, the master cylinder assembly 400 is configured for setting/adjustment of the brake stroke (e.g. start, travel, etc.); as indicated schematically, the start of the stroke of the brake may be set by the position at which a feature 450a on link 450 engages the pushrod 435 (e.g a feature on or connected to link 450 such as a projection, surface, cam, stop, limit, etc.); the feature on and/or connected to the link may be formed/shaped and configured so that setting/adjustment of the brake stroke and/or lever action/actuation may be provided by direct engagement (e.g. as a mechanism, mechanical stop, etc. with engagement of the link/feature and the pushrod/feature); as indicated schematically, the feature may be a surface on the link and/or a feature of the link configured to engage of a surface of the pushrod and/or a feature of the pushrod. As indicated schematically, the full stroke limit may be set by the position of a stop within body 105 of the master cylinder assembly 400 (e.g. as a mechanical stop).

As indicated schematically according to an exemplary embodiment, the master cylinder assembly 400 is configured for setting/adjustment of the lever action/actuation (e.g. sensitivity, feel, travel before engagement, dead zone/lag, etc.). According to an exemplary embodiment, the lever action/actuation for master cylinder assembly can be set/adjusted so that an operator can balance (e.g. according to purpose, preference, etc.) such considerations as producing intended similarity or variation in sensitivity/feel of each brake lever (e.g. control for braking at front/rear wheel), dead zone/travel of the brake lever before the operation of the braking function is initiated, etc.

As indicated schematically in the FIGURES, according to an exemplary embodiment the master cylinder assembly may be configured to be adjusted/tuned within the indicated range to provide an intended performance for the operator.

Brake System—Caliper Assembly

As shown schematically according to an exemplary embodiment in FIGS. 1 and 2, the brake system BR may comprise a caliper assembly 300.

Figure 14B:
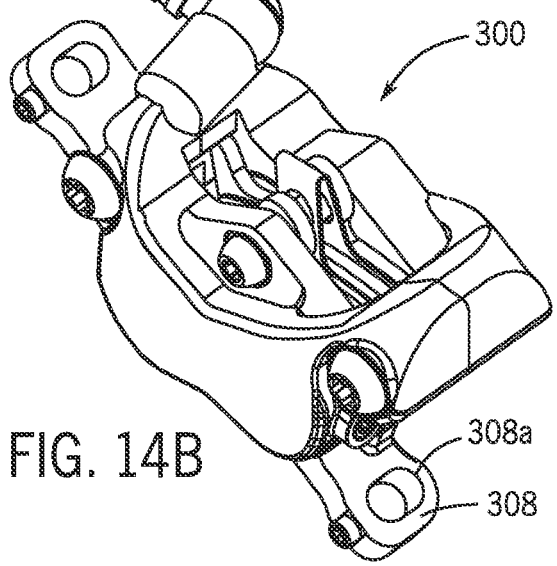
FIG. 14B is a schematic perspective view of a caliper assembly for a brake system according to an exemplary embodiment.
Figure 14C:
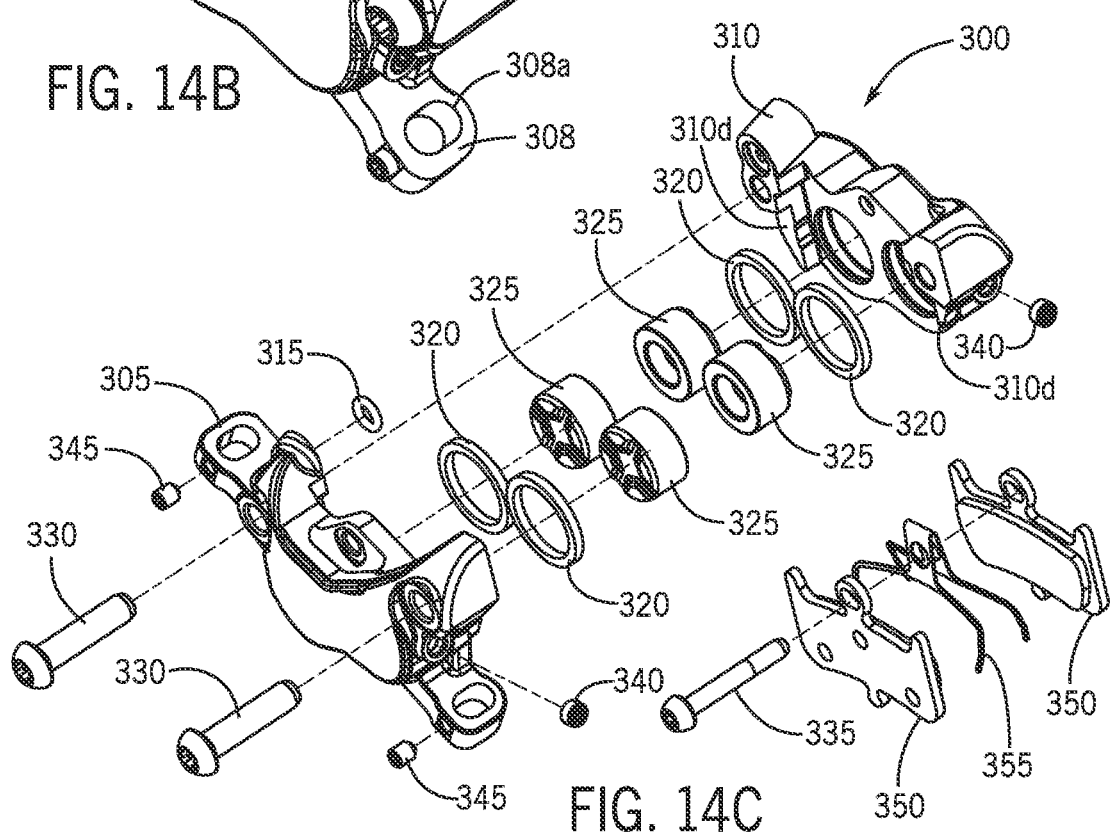
FIG. 14C is a schematic exploded perspective view of a caliper assembly for a brake system according to an exemplary embodiment.
Figure 15A:
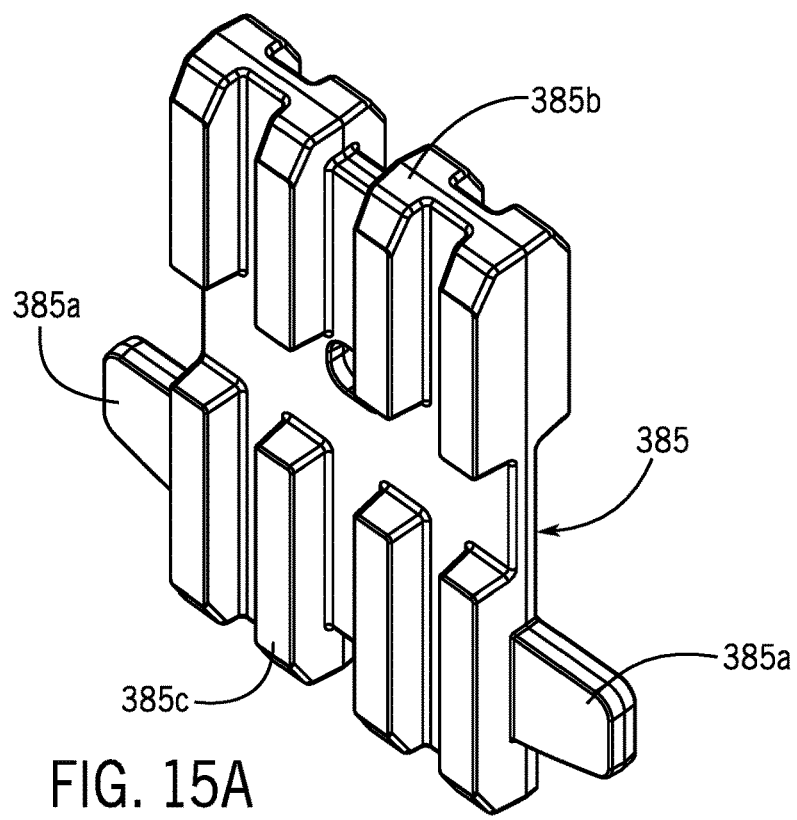
FIGS. 15A and 15B are schematic perspective views of a tool for a caliper assembly of a brake system according to an exemplary embodiment.
Figure 15B:
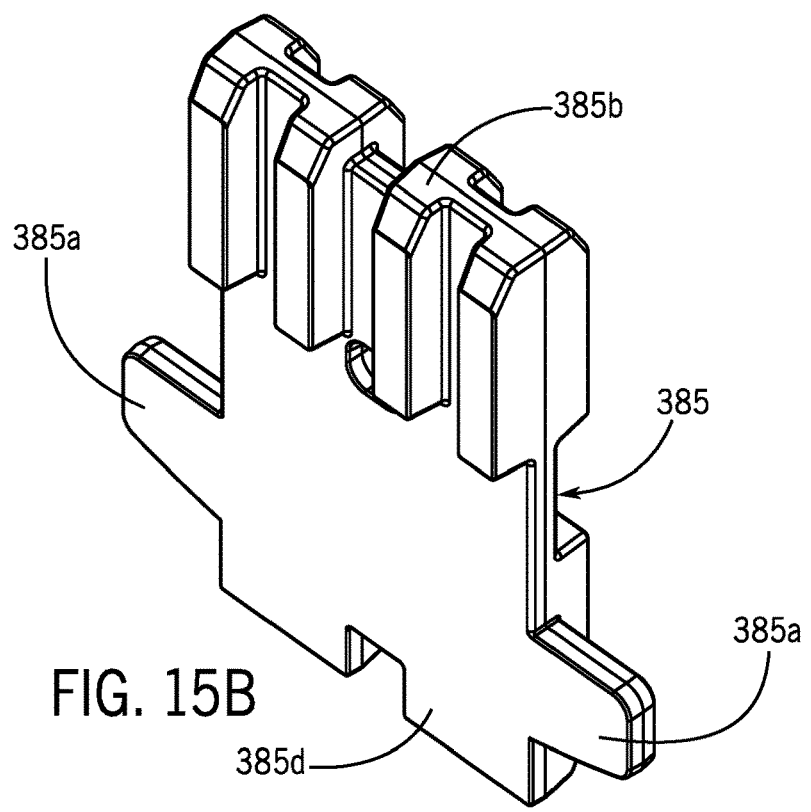
Figure 16A:
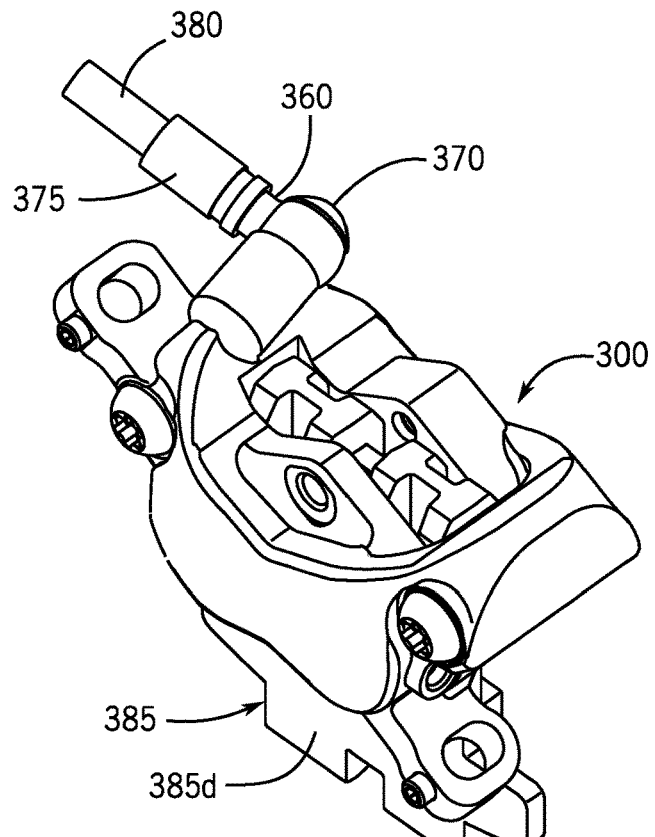
FIG. 16A is a schematic perspective view of a caliper assembly and tool for a brake system according to an exemplary embodiment.
Figure 16B:
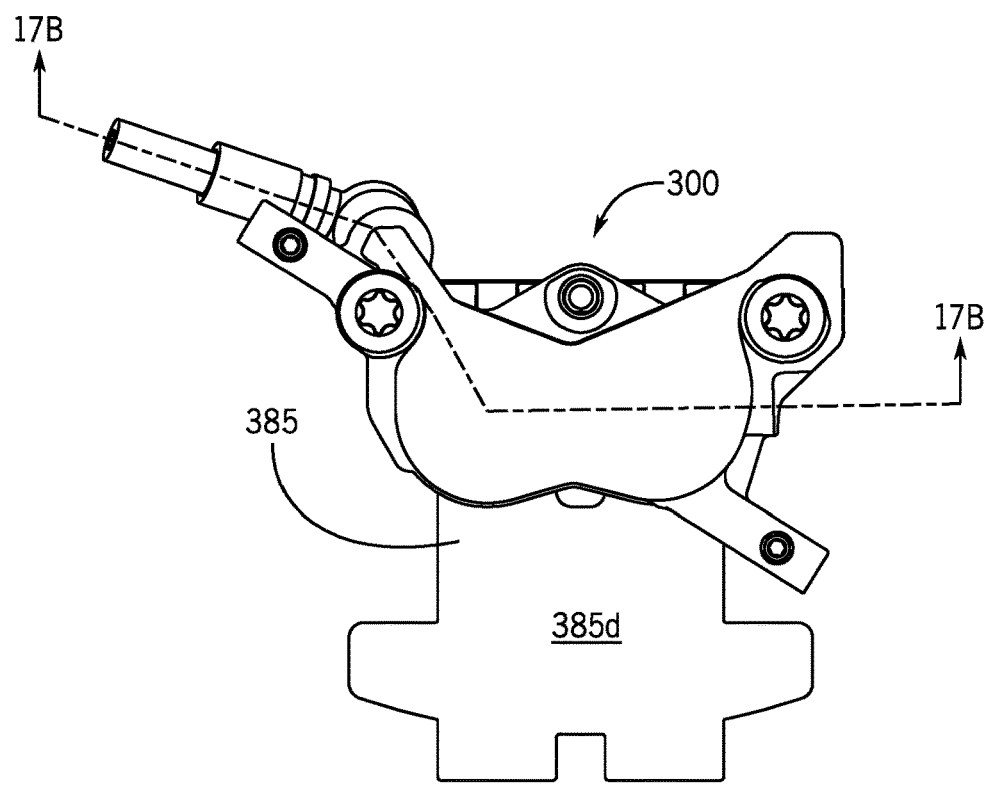
FIG. 16B is a schematic front elevation view of a caliper assembly and tool for a brake system and tool according to an exemplary embodiment.

As shown schematically in FIGS. 14A-14C, the caliper assembly 300 may comprise a body/body assembly (configured to contain hydraulic/brake fluid) comprising an outer body 305 (with a set of chambers provided with a plug shown as bleed plug 340) and an inner body 310 (with a set of chambers each provided with a plug shown as bleed plug 340) and a seal 315; outer body 305 is configured to be mounted on the fork/structure and comprises a mounting arrangement shown as comprising flanges 308 configured to engage features on the fork or frame structure and provides adjuster screws 345 configured to engage apertures/slots 308a in flanges 308 (e.g. for mounting/adjustment of position of the body of the caliper assembly on the fork or frame structure).

As shown schematically in FIGS. 14A-14C, outer body 305 and inner body 310 are assembled to form a recess/slot for the disc/rotor D of the wheel and secured by screws 330 to provide a network/set of flow paths for hydraulic/brake fluid and to contain a piston arrangement operated by hydraulic/brake fluid for the set of chambers in the body assembly (e.g. controlled and configured to engage/release the brake rotor/disc on the wheel in operation of the braking function through the brake pad assembly engaged with the set of pistons); the piston arrangement comprises a set of piston assemblies comprising a piston 325 fitted and secured with seals shown as square seals/rings 320 for each set of chambers in the body assembly and configured to be actuated in braking operation (e.g. to engage/release the brake pad against the disc/rotor for the wheel). As shown schematically in FIG. 14C, the caliper assembly may comprise a set of brake pads 350 engaged with the piston arrangement through a spring shown as pad spring 355 attached by a screw shown as brake pad screw 335.

As shown schematically according to an exemplary embodiment in FIGS. 2, 14A-14C and 16A-16B, the body of the caliper assembly 300 is coupled by fluid connection (e.g. hydraulic brake fluid circuit/flow) through a coupling/interface (e.g. conduits/connectors shown as fitting/banjo 360 and connector/banjo bolt 370 with coupling/sleeve 375) at port/hose 380 to the master cylinder assembly of the brake system (e.g. configured so that lever action at the master cylinder assembly transmitted by the brake fluid will actuate the operation of the braking function to engage/release the brake pad on the rotor/disc at the wheel). See also FIG. 1.

As shown schematically according to an exemplary embodiment in FIGS. 15A-15B, 16A-16B and 20A-20C, a tool shown as block or bleed block 385 may be provided and configured to facilitate maintenance by selective engagement with the piston arrangement upon installation/insertion into a recess in the body of the caliper assembly 300.

Referring to FIGS. 15A-15B and 20B-20C, as shown schematically according to an exemplary embodiment, one end of tool/block 385 comprises a set of two ridge sections 385b (one multiple-ridge section on each side of the surface of the tool/block); one end of tool/block 385 comprises a ridge section 385c and a flat/flat surface section 385d (one multiple-ridge section on one side of the surface and one flat section on one side of the surface of the tool/block) and flanges 385a. See also FIGS. 20B and 20C.

As shown schematically according to an exemplary embodiment in FIGS. 16A-16B and 20A-20C, block 385 is configured to be installed/inserted into the recess of the body 305/310 of the caliper assembly 300 in a variety of orientations. Compare FIGS. 16A-16B, 17A-17B, 18A-18B and 19A-19B (e.g. insertion of tool/block 385 in orientation with two ridge sections 385*b* engaging and retaining sets of pistons 325 on both of outer body 305 and inner body 310) and FIGS. 20A-20C and 21A-21C (e.g. insertion of tool/block 385 in orientation with flanges 385*a* seated in slots 310*d* of the body and one ridge section 385*c* engaging and retaining one set of pistons 325 on outer body 305 and flat section 385*d* providing space/allowing movement of one set of pistons 325 on inner body 310).

As indicated schematically according to an exemplary embodiment in FIGS. 16A-16B, 17A-17B, 18A-18B and 19A-19B, the tool shown block 385 is configured to be installed/inserted in coordination with the use of plugs shown as bleed plugs 340 to facilitate the flow/bleed of air and/or fluid within and from the body of the caliper assembly 300. (The flow paths according to an exemplary embodiment have been indicated schematically with an indicated example direction of flow F; in use/operation the flow through the indicated flow paths may be provided in the indicated example direction or in a reverse/opposed/counter-direction through the indicated flow paths.)

Figure 17A:
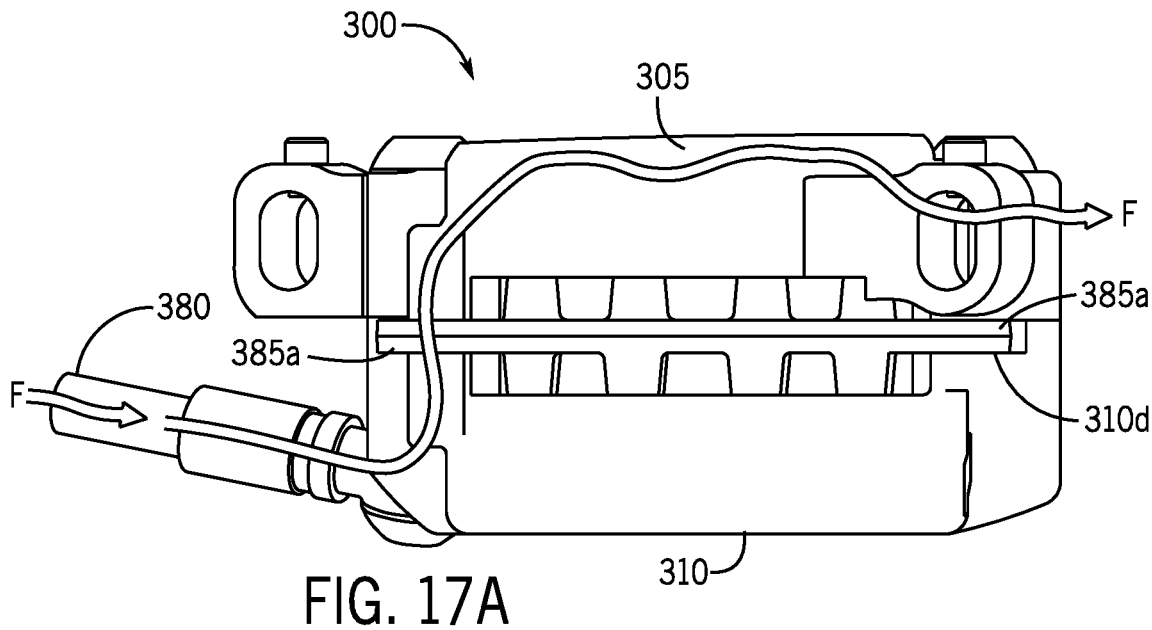
FIGS. 17A and 18A and 19A are schematic plan views of a caliper assembly with tool for a brake system according to an exemplary embodiment.
Figure 17B:
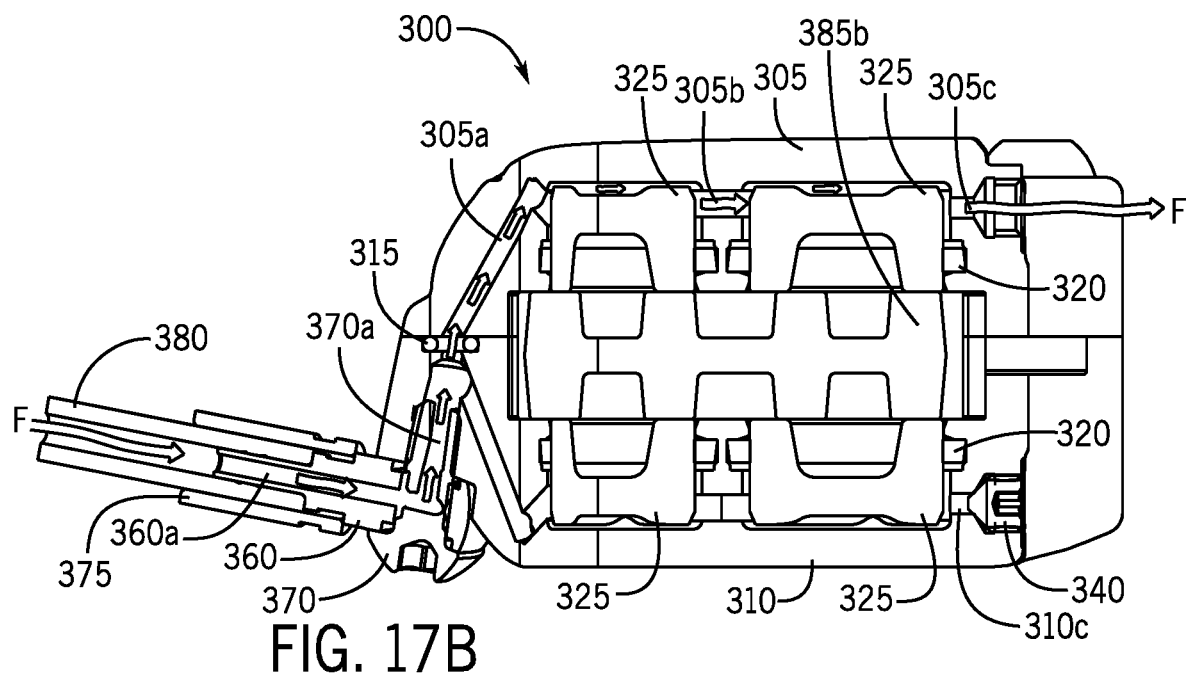
FIGS. 17B and 18B and 19B are schematic plan cross-section views of a caliper assembly with tool for a brake system according to an exemplary embodiment.

As shown schematically in FIGS. 17A-17B, with block 385 installed/inserted so that ridge sections 385*b* engage and retain the set of pistons 325 in inner body 310 and the set of pistons 325 in outer body 305 and with a bleed plug removed from port 305*c* of outer body 305 and with bleed plug 340 inserted in port 310*c* of inner body 310 a flow path is established (as indicated schematically by flow F) in the body from the port/hose 380 through passage 360*a* and passage 370*a* and to and through passage 305*a* and passage 305*b* and port 305*c* of outer body 305 of caliper assembly 300 (e.g. removing/bleeding air and/or fluid from the outer body).

Figure 18A:
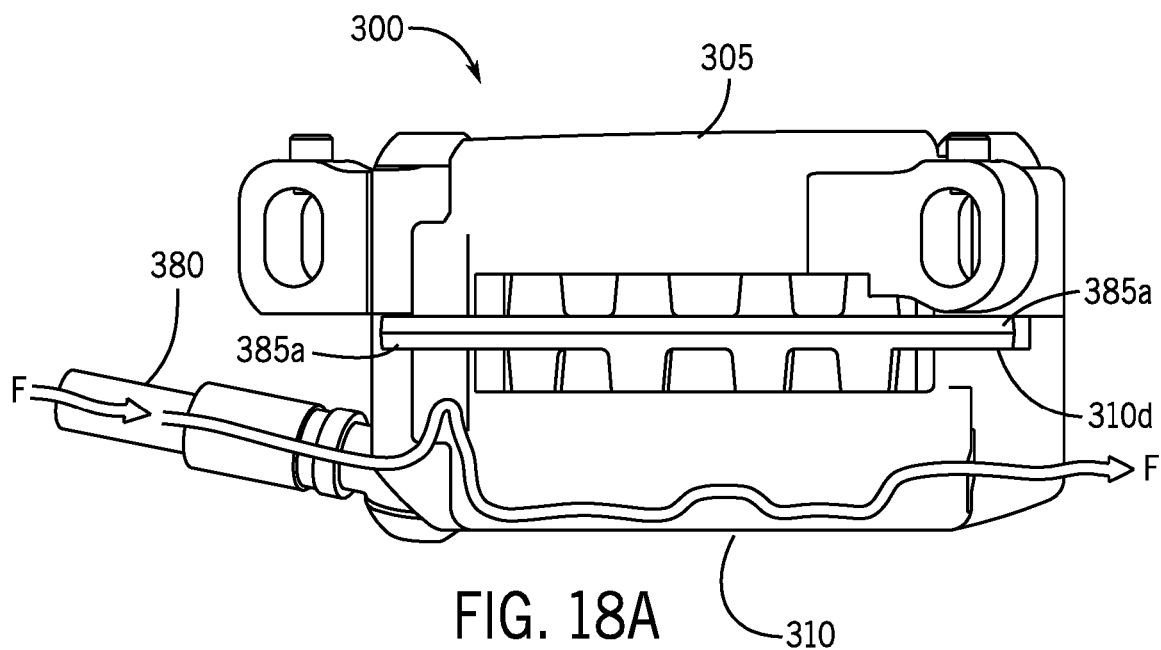
Figure 18B:
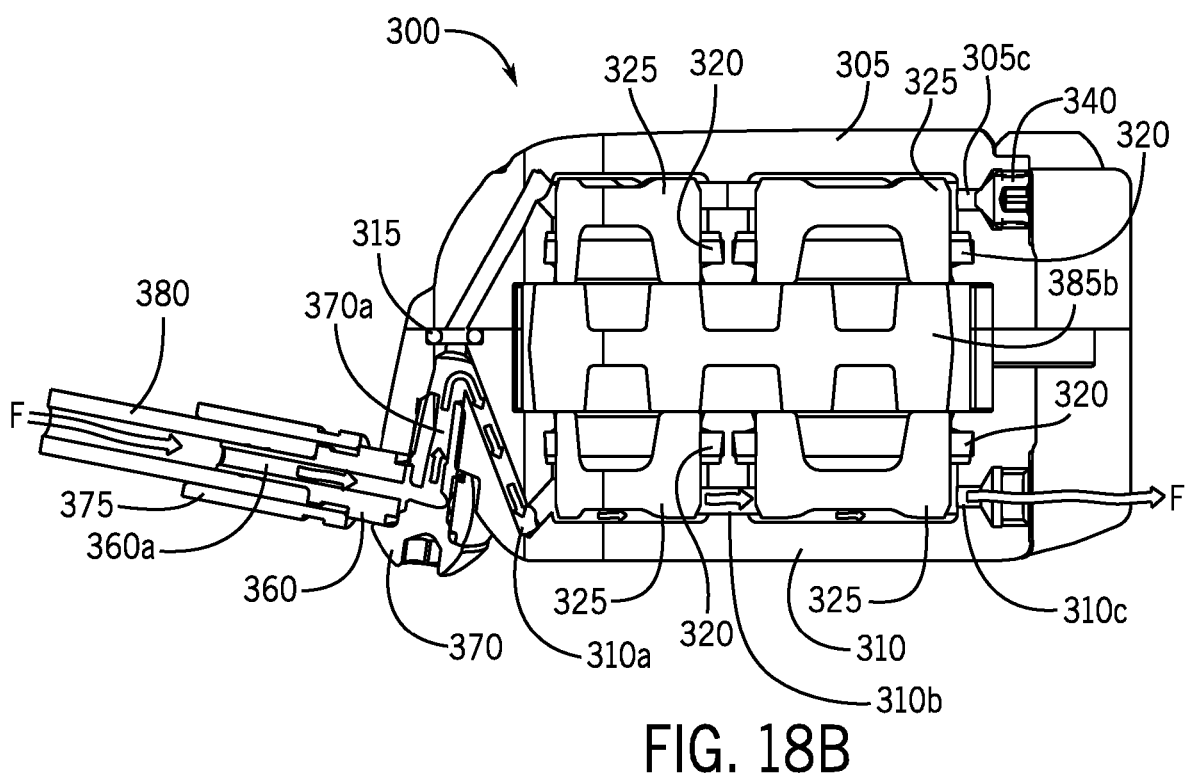

As shown schematically in FIGS. 18A-18B, with block 385 installed/inserted so that ridge sections 385*b* engage and retain the set of pistons 325 in inner body 310 and the set of pistons 325 in outer body 305 and with bleed plug 340 inserted in port 305*c* of outer body 305 and with bleed plug removed from port 310*c* of inner body 310 a flow path is established (as indicated schematically by flow F) in the body from the port/hose 380 through passage 360*a* and passage 370*a* and to and through passage 310*a* and passage 310*b* and port 310*c* of inner body 310 of caliper assembly 300 (e.g. removing/bleeding air and/or fluid from the inner body).

Figure 19A:
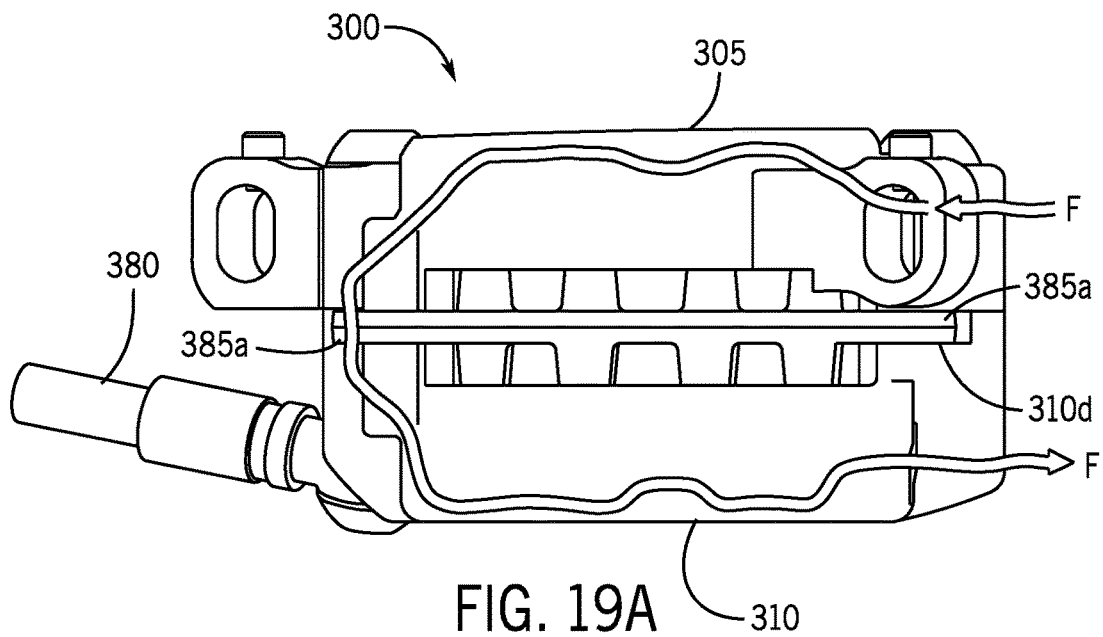
Figure 19B:
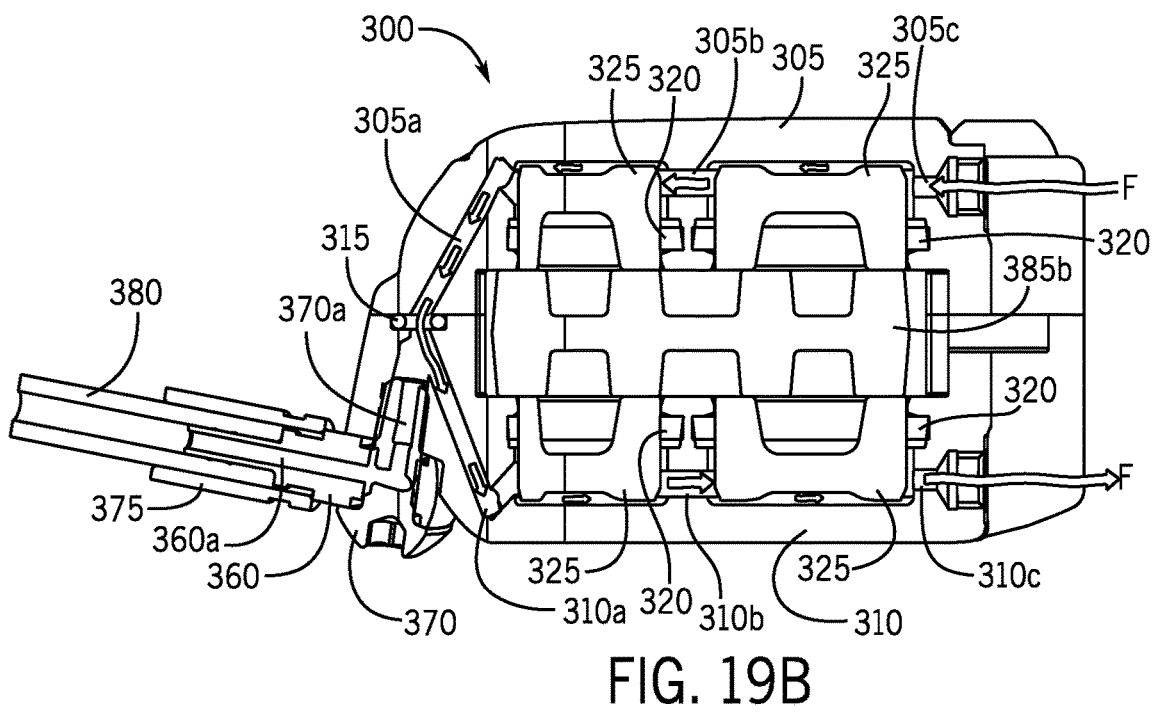
Figure 21A:
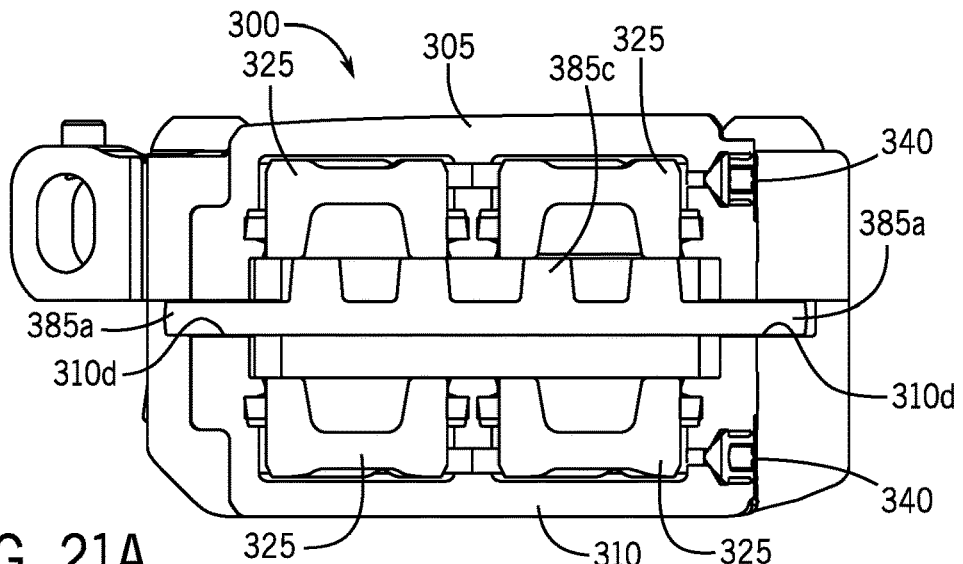
FIGS. 21A to 21C are schematic plan cross-section views of a caliper assembly with tool for a brake system according to an exemplary embodiment.
Figure 21B:
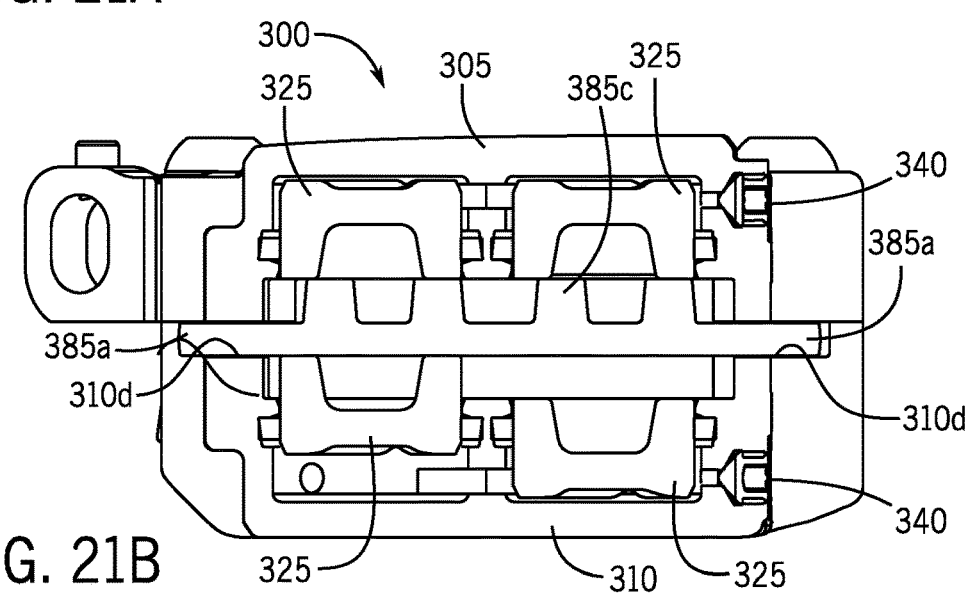
Figure 21C:
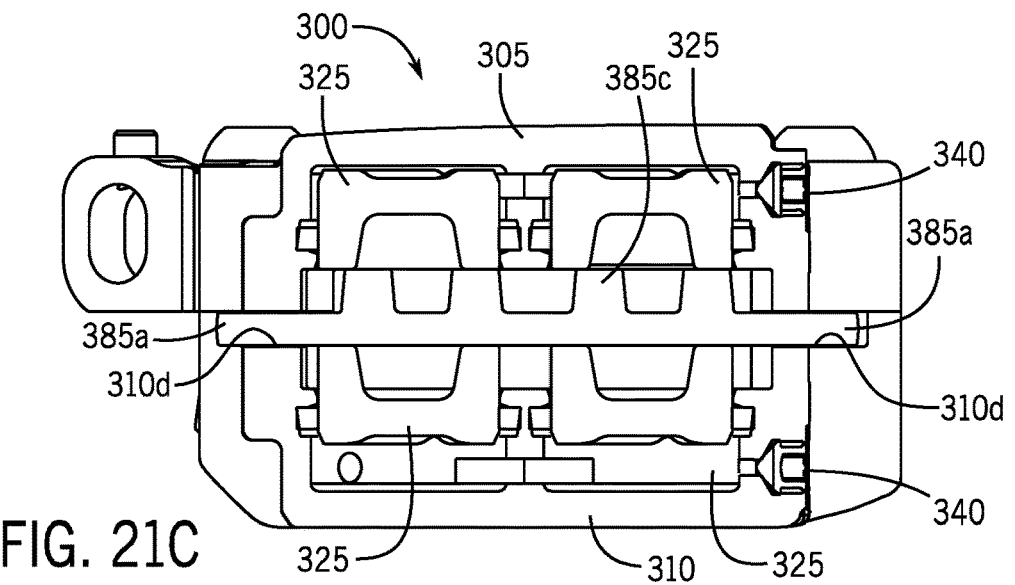

As shown schematically in FIGS. 19A-19B, with block 385 installed/inserted so that ridge sections 385*b* engage and retain the set of pistons 325 in inner body 310 and the set of pistons 325 in outer body 305 and with a bleed plug removed from port 305*c* of outer body 305 and with bleed plug removed from port 310*c* of inner body 310 and with the port/hose 380 closed a flow path is established (as indicated schematically by flow F) within the body through port 305*c* and passage 305*b* and passage 305*a* of outer body 305 of caliper assembly 300 and to and through passage 310*a* and passage 310*b* and port 310*c* of inner body 310 of caliper assembly 300 (e.g. removing/bleeding air and/or fluid from the entire body of the caliper assembly).

As indicated schematically according to an exemplary embodiment, the caliper assembly is configured to provide flow paths that facilitate the removal/bleed of air (e.g. by providing ports, flow/bleed paths, double-bleed flow paths, etc. independent of the use of a tool/block to assist). See FIGS. 17A-17B, 18A-18B and 19A-19B. As indicated schematically, a flow path may be established (as indicated schematically by flow F) in the body from the port/hose 380 through passage 360*a* and passage 370*a* and to and through passage 305*a* and passage 305*b* and port 305*c* of outer body 305 of caliper assembly 300 (e.g. removing/bleeding air and/or fluid from the outer body) without the need of the took/block (see FIGS. 17A-17B); a flow path may be established (as indicated schematically by flow F) in the body from the port/hose 380 through passage 360*a* and passage 370*a* and to and through passage 310*a* and passage 310*b* and port 310*c* of inner body 310 of caliper assembly 300 (e.g. removing/bleeding air and/or fluid from the inner body) (see FIGS. 18A-18B); with the port/hose 380 closed a flow path is established (as indicated schematically by flow F) within the body through port 305*c* and passage 305*b* and passage 305*a* of outer body 305 of caliper assembly 300 and to and through passage 310*a* and passage 310*b* and port 310*c* of inner body 310 of caliper assembly 300 (e.g. removing/bleeding air and/or fluid from the entire body of the caliper assembly) (see FIGS. 19A-19B).

As shown schematically in FIGS. 20A, 20C and 21A-21C, with block 385 installed/inserted so that ridge section 385*c* engages and retains the set of pistons 325 in outer body 305 (the set of pistons 325 in inner body 310 is not engaged or retained by flat section 385*d*) and with bleed plug 340 inserted in port 310*c* of inner body 310 and with bleed plug 340 inserted in port 305*c* of outer body 305 the set of pistons 325 in inner body 310 are able to move by actuation to position for maintenance (e.g. lubrication, etc.). As indicated schematically in FIG. 20B, with block 385 installed/inserted so that ridge section 385*c* engages and retains the set of pistons 325 in inner body 310 (the set of pistons 325 in outer body 305 is not engaged or retained by flat section 385*d*) and with bleed plug 340 inserted in port 310*c* of inner body 310 and with bleed plug 340 inserted in port 305*c* of outer body 305 the set of pistons 325 in outer body 305 are able to move by actuation to position for maintenance (e.g. lubrication, etc.).

As shown schematically in FIGS. 20B and 20C, tool/block 385 is configured to be installed into the recess of the body 305/310 of the caliper assembly 300 (e.g. with flanges 385*a* seated in slots 310*d* of the body).

As indicated schematically according to an exemplary embodiment, the caliper assembly is configured to provide flow paths that facilitate the removal/bleed of air (e.g. by providing ports, flow/bleed paths, double-bleed flow path, etc.) with or without the use of a tool/block.

TABLES—REFERENCE SYMBOLS

TABLE A

| REFERENCE SYMBOL | ELEMENT, PART OR COMPONENT |
|---|---|
| B | BICYCLE |
| FR | FRAME |
| FW | FRONT WHEEL |
| RW | REAR WHEEL |
| SP | SEAT POST |
| S | SEAT |
| T | STEERING TUBE |
| ST | STEM |
| H | HANDLEBAR |
| G | GRIP (HANDLEBAR) |
| F | FRONT FORK ASSEMBLY |

TABLE A-continued

| REFERENCE SYMBOL | ELEMENT, PART OR COMPONENT |
|---|---|
| SH | REAR SHOCK ABSORBER FOR SUSPENSION SYSTEM |
| BR | BRAKE SYSTEM |
| D | DISC/ROTOR (BRAKE) |
| P | PEDAL |

TABLE B

| REFERENCE SYMBOL | ELEMENT, PART OR COMPONENT |
|---|---|
| 100/400 | MASTER CYLINDER ASSEMBLY |
| 105 | BODY<br>with end surface 105a and port timing hole 105b |
| 110 | PISTON |
| 115 | BUSHING |
| 120 | PRIMARY CUP |
| 125 | SECONDARY CUP |
| 130 | SPRING |
| 135/435 | PUSHROD<br>(with flange 135a and recess 135b) |
| 140 | NUT |
| 145 | BUSHING |
| 150/450 | LINK<br>(with shoulder 150a and end surface 150b or feature 450a) |
| 155 | LEVER<br>with shoulder 155a and flats 155b |
| 160 | SLIDE<br>with flats 160a and flange 160b |
| 165 | TORSION SPRING |
| 170 | ADJUSTER KNOB |
| 175 | PLATE (WASHER)<br>with flats 175a and slots 175b |
| 180 | BALL |
| 185 | SPRING |
| 190 | PIVOT NUT |
| 195 | BEARING |
| 202 | BOLT |
| 205 | BLADDER |
| 210 | COVER |
| 215 | SCREW |
| 220 | CLAMP (BASE) |
| 225 | SCREW (CLAMP) |
| 230 | BLEED PLUG |
| 235 | ADJUSTER SCREW with head 235a |
| 240 | SET SCREW |
| 245 | TOOL with tip 245a |
| 250 | TOOL |

TABLE C

| REFERENCE SYMBOL | ELEMENT, PART OR COMPONENT |
|---|---|
| 300 | CALIPER ASSEMBLY |
| 305 | OUTER BODY<br>(with passages 305a/305b and port 305c) |
| 310 | INNER BODY<br>(with passages 310a/310b and port 310c and slot 310d) |
| 315 | SEAL |
| 320 | SQUARE SEAL |
| 325 | PISTON |
| 330 | SCREW |
| 335 | PAD PIN |
| 340 | BLEED PLUG |
| 345 | ADJUSTER SCREW |
| 350 | BRAKE PAD |
| 355 | PAD SPRING |
| 360 | CONNECTOR/CONDUIT (BANJO) |

TABLE C-continued

| REFERENCE SYMBOL | ELEMENT, PART OR COMPONENT |
|---|---|
| | with passage 360a |
| 365 | SEAL |
| 370 | CONNECTOR/CONDUIT (BANJO BOLT)<br>with passage 370a |
| 375 | SLEEVE |
| 380 | HOSE |
| 385 | TOOL/BLEED BLOCK<br>(with flanges 385a and ridge sections 385b/c and flat section 385d) |

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A brake system configured to be operable by an actuator comprising:
   (a) a caliper assembly; and
   (b) a master cylinder assembly comprising
      a body;
      a piston configured to move from an initial stroke position along a full stroke within the body to actuate braking action at the caliper assembly;
      a pushrod configured to engage the piston;
      a link actuated by the actuator and configured to engage the pushrod into engagement with the piston;
      an adjuster substantially within the body;
      wherein the initial stroke position of the piston is configured to be set by the adjuster acting at the link engaged at the pushrod and configured to determine a distance of movement by the actuator before braking action is actuated at the caliper assembly;
      wherein the adjuster acting at the link is configured to engage the pushrod within the body.

2. The system of claim 1 wherein the adjuster comprises a screw within the link configured to contact a flange on the pushrod.

3. The system of claim 1 wherein the caliper assembly comprises a body configured to provide a series of flow paths to facilitate maintenance by facilitating flow of fluid within and from the body; wherein the caliper assembly further comprises plugs to direct fluid within and from the body; wherein the caliper assembly is configured for use of a tool to facilitate maintenance; wherein the tool comprises a tool block configured to be inserted into the body of the caliper assembly.

4. A brake system comprising:
   a master cylinder assembly comprising
   a body;
   a piston configured to move from an initial stroke position along a stroke within the body;
   a pushrod configured to engage the piston;
   a link coupled within the body and configured to engage the pushrod;
   an adjuster;
   wherein the initial stroke position of the piston is configured to be set by the adjuster acting at the link engaged at the pushrod;
   wherein the adjuster is configured to contact the pushrod within the body to adjust the initial stroke position of the piston.

5. The system of claim 4 wherein the adjuster comprises a screw; wherein the pushrod comprises a threaded end; wherein the link comprises a bushing for the adjuster; wherein the initial stroke position of the piston is set by relative position of the threaded end of the pushrod to the bushing on the link.

6. The system of claim 4 wherein the initial stroke position of the piston is configured to be adjusted by the adjuster.

7. The system of claim 4 wherein the initial stroke position of the piston is configured to be set by contact between the adjuster and the pushrod; wherein the adjuster is within the link; and wherein the initial stroke position of the piston is configured to be set by the adjuster within the link as a stop for the pushrod.

8. The system of claim 4 wherein the initial stroke position of the piston is configured to be adjusted by contact between the adjuster and the pushrod.

9. The system of claim 8 wherein the adjuster comprises a screw within the link; wherein the screw of the adjuster within the link is configured to engage the pushrod as a stop; and wherein the initial stroke position of the piston is configured to be adjusted by the screw of the adjuster within the link as a stop for the pushrod.

10. The system of claim 4 wherein the pushrod comprises a flange; and wherein the adjuster is configured to be adjusted to engage the flange on the pushrod to set the initial stroke position of the piston.

11. The system of claim 10 wherein the adjuster comprises an adjuster screw; wherein the adjuster screw comprises an end configured to engage the flange on the pushrod.

12. The system of claim 4 wherein contact by the adjuster comprises contact with a flange on the pushrod.

13. The system of claim 12 wherein the adjuster is configured to adjust the initial stroke position of the piston by engagement with the pushrod.

14. The system of claim 4 wherein the initial stroke position of the piston determines a length of stroke of the piston before braking action at a caliper assembly.

15. The system of claim 4 wherein the stroke of the piston comprises a full stroke set by contact between the pushrod and the body.

16. A brake system comprising:
   a master cylinder assembly comprising
   a body;
   a piston configured to move from an initial stroke position along a stroke within the body;
   a pushrod configured to engage the piston;
   an adjuster screw substantially within the body and configured to engage a flange on the pushrod;
   wherein the initial stroke position of the piston is configured to be set by the adjuster screw acting on the flange on the pushrod within the body.

17. The system of claim 16 further comprising a link coupled within the body and configured to engage the pushrod.

18. The system of claim 17 wherein the adjuster screw is at least partially within the link.

19. The system of claim 16 wherein the initial stroke position of the piston is configured to be adjusted by the adjuster screw.

20. The system of claim 19 further comprising a brake lever configured to move from an initial position to an actuation position to actuate the piston of the master cylinder assembly; wherein the adjuster screw is configured to adjust of the initial stroke position of the piston and the initial position of the brake lever.

* * * * *